United States Patent
Simonson et al.

(10) Patent No.: US 6,192,319 B1
(45) Date of Patent: Feb. 20, 2001

(54) STATISTICAL IMPACT ANALYSIS COMPUTER SYSTEM

(75) Inventors: Mark C. Simonson, Ann Arbor; Jun Zhao, Troy; Jaesung Cha, Ann Arbor, all of MI (US)

(73) Assignee: CFI Group, Ann Arbor, MI (US)

(*) Notice: Under 35 U.S.C. 154(b), the term of this patent shall be extended for 0 days.

(21) Appl. No.: 09/066,221

(22) Filed: Apr. 24, 1998

(51) Int. Cl.[7] .................................................. G06F 17/60
(52) U.S. Cl. ............................... 702/81; 702/179; 705/10
(58) Field of Search ............................... 702/81, 84, 179, 702/181; 705/1, 10; 707/1, 104

(56) References Cited

U.S. PATENT DOCUMENTS

| | | | |
|---|---|---|---|
| 5,278,751 | * | 1/1994 | Adiano et al. ........................ 364/402 |
| 5,734,890 | * | 3/1998 | Case et al. ............................ 395/605 |
| 5,884,305 | * | 3/1999 | Kleinberg et al. ....................... 707/6 |
| 6,003,013 | * | 12/1999 | Boushy et al. .......................... 705/10 |
| 6,049,797 | * | 4/2000 | Guha ........................................ 707/6 |
| 6,061,658 | * | 5/2000 | Chou et al. ............................. 705/10 |

OTHER PUBLICATIONS

Bryant et al., "Crossing the Threshold", Marketing Research, Winter, 1996.*
Cassel et al., "Robustness of Partial Least–Squares Method for Estimating Latent Variable Quality Structures", Journal of Applied Statistics, May, 1999.*
H. Wold (1982) Soft Modeling: The Basic Design and Some Extensions; K.G. Joreskogand H. Wold (Eds.) Systems Under Indirect Observation: Casality and Prediction, vol. 2, Amsterdam: North Holland, pp. 1–54.
H. Wold (1975) Soft Modeling by Latent Variables: the Non–Linear Iteractive Partial Least Squares Approach; Perspectives in Probability and Statistics: Papers in Honor of M.S. Bartlett. J. Gani (Ed.) Academic Press, London.
Joreeskog, K.G. and Sorbom, D. (1981) Lisrel VI User's Guide, Chicago: National Educational Resources. (In the Specification the Lisrel V User's Guide is cited. This Manual is not readily available. The Lisrel VI manual is believed to contain substantially the same disclosure).
Bryant, Barbara Everitt and Cha, Jaesung (1996), Crossing the Threshold: Some Customers Are Harder to Please Than Others, Marketing Research, vol. 8, No. 4, Winter.
Fornell, Claes (Jan., 1992) A National Customer Satisfaction Barometer: The Swedish Experience, Journal of Marketing, vol. 56, pp. 6–21.
Fornell, Claes (May 13, 1999) Scientific Rigor: Market Demands and methodology Evolution.
Fornell, Claes and Bryand, Barbara Everitt (May 4, 1998) The American Customer Satisfaction Index, H. Simon and C. Homburg (Eds.) Customer Satisfaction Handbook.
Fornell, Claes and Cha, Jaesung (1994) Partial Least Squares, Richard Bagozzi (Ed.), Advanced Methods of Marketing, pp. 52–78.

* cited by examiner

Primary Examiner—Patrick Assouad
(74) Attorney, Agent, or Firm—Harness, Dickey & Pierce, P.L.C.

(57) ABSTRACT

A computer-implemented apparatus and method for determining the impacts of predetermined customer characteristics associated with measured physical attributes. A manifest variable database is utilized for storing manifest variable data that is indicative of the measured physical attributes. A partial least squares determinator is connected to the manifest variable database for determining statistical weights based upon the stored manifest variable data. A weights database which is connected to the partial lease squares determinator is utilized for storing the determined weights. A latent variable determinator is connected to the weighing database for determining scores for latent variables based upon the stored manifest variables and upon the stored weights. The latent variables are indicative of the predetermined customer characteristics. Additionally, a latent variable database is connected to the latent variable score determinator for storing the determined latent variable scores. An impact determinator is connected to the latent variable database for determining impact relationships among the latent variables based upon the stored latent variable scores.

18 Claims, 23 Drawing Sheets

CFI Run Report

Client: TRAINSYS  Project: SNAAP  Phase: P97_02  Model: SUE_(A1)  Version: 01

Model Selection Criteria: AVON_REP = 1

Labels: Cha Shau Bau

Comments:

⎫
⎬ 454
⎭

Version: 01

Non-Missing Selection Percent: 67.5%  Min N To Run Cut ___  Case Weighting ☐

Weight Substitution If N <= 92  Select Manifest for Non-Missing Selection ☒

Score Pooling ☐  Copy Impacts If N <= / Calculate If N > 92

Impact Pooling ☐  Use Intermediate Impacts ☐

Comments:

| ccutid | 001_01_002 |
|---|---|
| ksource | (All) |

| clabelmain | cmodelver | cvarname | cvarlabel1 |
|---|---|---|---|
| SEGMENT 2 | 01 | BROCH1 | BROCHURE - INFORMATION |
| | | BORCHUR1 | Excitement of the brochures |
| | | BROCHUR2 | Appeal of special offers/discounts |
| | | BROCHUR3 | Ease of understanding special offers |
| | | BROCHUR4 | Product information provided |
| | | BROCHUR5 | Accuracy of color charts |
| | | BROCH2 | BROCHURES - NUMBER AND COST |
| | | BROCHUR6 | Number of brochures you can get |
| | | BROCHUR7 | Cost to purchase brochures |
| | | SAMPLES | SAMPLES |
| | | SAMPLE1 | Number of free samples |
| | | SAMPLE2 | Cost to purchase additional samples |
| | | PRODUCTS | PRODUCT |
| | | PRODUCT1 | Quality of the products |
| | | PRODUCT2 | Value for the money |
| | | PRODUCT3 | Information Avon provides you |
| | | PRODUCT4 | Variety of products offered |
| | | AVERTIS | ADVERTISING |
| | | ADVER1 | How much Avon advertises |
| | | ADVER2 | Avon's reputation |
| | | ORDERING | ORDERING PROCESS |
| | | ORDER1 | Ease of filling out form |
| | | ORDER2 | Ease of making payments |
| | | ORDER3 | How frequently you can order |
| | | BROCHUR8 | Frequency of new brochures |
| | | DELIV1 | DELIVERY PROCESS |
| | | DELIVER1 | Number of days to receive order |
| | | DELIVER2 | Punctuality of your delivery |
| | | DELIVER3 | Courteousness of the delivery person |

FIG. 7

Model: SUF   Version: 01                                                          Run Report
Cut ID 000_00_2   Final Version ☒   Run ID A101                        Total    480
Selection Criteria                                                     In Model 469
Labels:                                           Weights Method CALC
1.                                                Impacts Method CALC
2.
3.                                                Case Weighting ☐
4.
5.
6.

| LV | Variables: | LV-> MV-> | Valid_N Valid_N | Score Score | StdDev StdDev | UnStd Wgt | Std Loading | Raw Mean | Raw StdDev |
|---|---|---|---|---|---|---|---|---|---|
| | Broch1 | | 469 | 74.1 | 14.80 | | | | |
| MV | Brochur1 | | 469 | 76.2 | 18.41 | 0.2 | 0.7 | 7.9 | 1.66 |
| | Brochur2 | | 468 | 81.4 | 19.18 | 0.2 | 0.7 | 8.3 | 1.73 |
| | Brochur3 | | 469 | 80.6 | 20.92 | 0.1 | 0.6 | 8.3 | 1.88 |
| | Borchur4 | | 468 | 72.3 | 21.71 | 0.2 | 0.7 | 7.5 | 1.95 |
| | Brochur5 | | 458 | 55.1 | 27.80 | 0.1 | 0.7 | 6.0 | 2.5 |
| | Broch2 | | 463 | 60.2 | 27.44 | | | | |
| | Brochur6 | | 435 | 80.4 | 29.60 | 0.2 | 0.7 | 8.2 | 2.66 |
| | Brochur7 | | 435 | 44.8 | 32.71 | 0.3 | 0.9 | 5.0 | 2.94 |
| | Samples | | 469 | 50.6 | 29.70 | | | | |
| | Sample1 | | 465 | 54.3 | 33.94 | 0.2 | 0.9 | 5.9 | 3.05 |
| | Sample2 | | 454 | 47.2 | 31.25 | 0.2 | 0.9 | 5.3 | 2.81 |
| | Products | | 469 | 82.2 | 13.90 | | | | |
| | Product1 | | 468 | 86.5 | 16.35 | 0.2 | 0.8 | 8.8 | 1.47 |
| | Product2 | | 467 | 77.3 | 19.47 | 0.2 | 0.8 | 8.0 | 1.75 |
| | Product3 | | 469 | 81.2 | 20.25 | 0.2 | 0.8 | 8.3 | 1.82 |
| | Product4 | | 466 | 83.4 | 17.55 | 0.2 | 0.7 | 8.5 | 1.58 |
| | Advertis | | 468 | 66.1 | 22.95 | | | | |
| | Advert1 | | 458 | 56.4 | 28.15 | 0.2 | 0.9 | 6.1 | 2.53 |
| | Advert2 | | 466 | 73.5 | 24.51 | 03 | 0.9 | 7.6 | 2.21 |
| | Ordering | | 469 | 83.4 | 14.14 | | | | |
| | Order1 | | 467 | 87.4 | 19.51 | 0.2 | 0.6 | 8.9 | 1.76 |
| | Order2 | | 468 | 91.7 | 14.80 | 0.2 | 0.6 | 9.3 | 1.33 |
| | Order3 | | 466 | 79.3 | 24.50 | 0.2 | 0.8 | 8.1 | 2.21 |
| | Brochur8 | | 462 | 73.6 | 27.10 | 0.2 | 0.7 | 7.6 | 2.44 |
| | Deliv1 | | 469 | 89.9 | 13.66 | | | | |
| | Deliver1 | | 468 | 85.7 | 19.55 | 0.3 | 0.8 | 8.7 | 1.76 |
| | Deliver2 | | 468 | 92.3 | 15.12 | 0.4 | 0.9 | 9.3 | 1.36 |
| | Deliver3 | | 410 | 92.0 | 16.25 | 0.2 | 0.5 | 9.3 | 1.46 |
| | Deliv2 | | 469 | 86.7 | 15.33 | | | | |
| | Deliver4 | | 469 | 87.4 | 17.50 | 0.4 | 0.8 | 8.9 | 1.57 |
| | Deliver5 | | 469 | 86.0 | 18.38 | 0.4 | 0.9 | 8.7 | 1.65 |
| | Shorts | | 467 | 67.6 | 21.15 | | | | |
| | Shorts1 | | 465 | 77.2 | 21.42 | 0.2 | 0.6 | 7.9 | 1.93 |
| | Shorts2 | | 363 | 62.9 | 26.31 | 0.1 | 0.9 | 6.7 | 2.37 |
| | Shorts3 | | 281 | 60.8 | 29.83 | 0.1 | 0.8 | 6.5 | 2.68 |
| | Shorts4 | | 430 | 52.0 | 29.08 | 0.1 | 0.7 | 5.7 | 2.62 |
| | Returns | | 409 | 80.8 | 19.40 | | | | |
| | Returns1 | | 387 | 76.9 | 7.03 | 0.1 | 0.7 | 7.9 | 2.43 |
| | Returns2 | | 346 | 86.7 | 20.90 | 0.2 | 0.8 | 8.8 | 1.88 |
| | Returns3 | | 342 | 80.1 | 22.38 | 0.2 | 0.8 | 8.2 | 2.01 |
| | Returns4 | | 390 | 77.0 | 27.08 | 0.1 | 0.8 | 7.9 | 2.44 |
| | Account | | 469 | 88.7 | 14.73 | | | | |
| | Account1 | | 446 | 91.7 | 14.54 | 0.3 | 0.8 | 9.3 | 1.31 |
| | Account2 | | 463 | 87.4 | 20.04 | 0.2 | 0.9 | 8.9 | 1.80 |
| | Account3 | | 460 | 87.8 | 18.95 | 0.2 | 0.9 | 8.9 | 1.71 |
| | Deliver6 | | 469 | 87.3 | 19.18 | 0.1 | 0.7 | 8.9 | 1.73 |
| | Service | | 257 | 83.6 | 18.15 | | | | |
| | Service2 | | 254 | 68.2 | 31.17 | 0.1 | 0.7 | 7.1 | 2.81 |

Location: R:\TRAINSYS\SNAAP\P97_02          Report printed: 07/24/97 10:29:01          Page 1

FIG. 8a

Model: SUE   Version: 01                                                    Run Report

| Cut ID 000_00_2 | Final Version [X] | Run ID A101 | | Total | 480 |
|---|---|---|---|---|---|
| Selection Criteria | | | | In Model | 469 |
| Labels: | | | Weights Method CALC | | |
| 1. | | | Impacts Method CALC | | |
| 2. | | | Case Weighting ☐ | | |
| 3. | | | | | |
| 4. | | | | | |
| 5. | | | | | |
| 6. | | | | | |

|  | LV-> | Valid_N | Score | StdDev | | | | |
|---|---|---|---|---|---|---|---|---|
| Variables: | MV-> | Valid_N | Score | StdDev | UnStd Wgt | Std Loading | Raw Mean | Raw StdDev |
| Service |  | 257 | 83.6 | 18.15 |  |  |  |  |
| Service3 |  | 255 | 79.7 | 25.74 | 0.1 | 0.9 | 8.2 | 2.32 |
| Service4 |  | 255 | 83.4 | 22.35 | 0.1 | 0.9 | 8.5 | 2.01 |
| Service5 |  | 257 | 90.5 | 17.81 | 0.2 | 0.8 | 9.1 | 1.60 |
| Service6 |  | 253 | 85.7 | 20.18 | 0.2 | 0.8 | 8.7 | 1.82 |
| Manager |  | 450 | 84.9 | 19.70 |  |  |  |  |
| Manager1 |  | 430 | 84.0 | 23.37 | 0.1 | 0.8 | 8.6 | 2.10 |
| Manager2 |  | 437 | 88.1 | 19.72 | 0.1 | 0.9 | 8.9 | 1.77 |
| Manager3 |  | 425 | 87.3 | 20.47 | 0.1 | 0.9 | 8.9 | 1.84 |
| Manager4 |  | 377 | 87.7 | 18.93 | 0.1 | 0.8 | 8.9 | 1.70 |
| Manager5 |  | 416 | 80.9 | 26.20 | 0.1 | 0.9 | 8.3 | 2.36 |
| Manager6 |  | 427 | 82.6 | 24.24 | 0.1 | 0.9 | 8.4 | 2.18 |
| Training |  | 455 | 79.2 | 20.03 |  |  |  |  |
| Train2 |  | 453 | 80.2 | 20.39 | 0.3 | 0.9 | 8.2 | 1.84 |
| Train3 |  | 361 | 64.2 | 30.63 | 0.1 | 0.8 | 6.8 | 2.76 |
| Train4 |  | 288 | 91.3 | 23.94 | 0.2 | 0.8 | 8.3 | 1.92 |
| Effort |  | 465 | 62.5 | 22.22 |  |  |  |  |
| Effort1 |  | 454 | 67.3 | 25.05 | 0.2 | 0.8 | 7.1 | 2.25 |
| Effort2 |  | 454 | 62.7 | 27.81 | 0.1 | 0.8 | 6.6 | 2.50 |
| Effort3 |  | 426 | 56.4 | 27.77 | 0.2 | 0.8 | 6.1 | 2.50 |
| Motivate |  | 467 | 70.4 | 21.91 |  |  |  |  |
| Motivat1 |  | 446 | 68.6 | 26.67 | 0.1 | 0.8 | 7.2 | 2.40 |
| Motivat2 |  | 456 | 71.7 | 26.04 | 0.1 | 0.8 | 7.5 | 2.34 |
| Motivat3 |  | 437 | 71.8 | 26.38 | 0.1 | 0.9 | 7.5 | 2.37 |
| Motivat4 |  | 363 | 71.4 | 27.43 | 0.1 | 0.9 | 7.4 | 2.47 |
| Motivat5 |  | 440 | 69.6 | 25.67 | 0.1 | 0.8 | 7.3 | 2.31 |
| Motivat7 |  | 449 | 68.9 | 27.62 | 0.1 | 0.8 | 7.2 | 2.49 |
| Satis |  | 469 | 77.6 | 16.90 |  |  |  |  |
| Satis1 |  | 468 | 80.5 | 19.07 | 0.2 | 0.9 | 8.2 | 1.72 |
| Satis2 |  | 463 | 74.1 | 20.10 | 0.2 | 0.9 | 7.7 | 1.81 |
| Satis3 |  | 460 | 78.1 | 20.02 | 0.2 | 0.8 | 8.0 | 1.80 |
| Recomend |  | 461 | 74.5 | 25.73 |  |  |  |  |
| Recommnd |  | 461 | 74.5 | 25.73 | 0.4 | 1.0 | 7.7 | 2.32 |

FIG. 8b

Model: SUE  Version: 01                                                         Run Report
Cut ID 000_00_2  Final Version ☒  Run ID A101                          Total    480
Selection Criteria                                                     In Model 469
Labels:                              Weights Method CALC
1.                                   Impacts Method CALC
2.                                   Case Weighting ☐
3.
4.
5.
6.

Direct Impact ← 508a

| Latent | Valid_N | Score | StdDev | Pooled | Satis | Recomend |
|---|---|---|---|---|---|---|
| R-square |  |  |  |  | 0.6 | 0.3 | ← 516
| Arsquare |  |  |  |  | 0.6 | 0.3 | ← 520
| Intercpt |  |  |  |  | -4.3 | 10.6 | ← 524
| Broch1 | 469 | 74.1 | 14.80 |  | 0.4 |  |
| Broch2 | 463 | 60.2 | 27.44 |  | 0.1 |  |
| Samples | 469 | 50.6 | 29.70 |  | 0.3 |  |
| Products | 469 | 82.2 | 13.90 |  | 1.0 |  |
| Advertis | 468 | 66.1 | 22.95 |  | 0.2 |  |
| Ordering | 469 | 83.4 | 14.14 |  | 0.3 |  |
| Deliv1 | 469 | 89.9 | 13.66 |  | 0.2 |  |
| Deliv2 | 469 | 86.7 | 15.33 |  |  |  |
| Shorts | 467 | 67.6 | 21.15 |  |  |  |
| Returns | 409 | 80.8 | 19.40 |  | 0.6 |  |
| Account | 469 | 88.7 | 14.73 |  |  |  |
| Service | 257 | 83.6 | 18.15 |  |  |  |
| Manager | 450 | 84.9 | 19.70 |  | 0.6 |  |
| Training | 455 | 79.2 | 20.03 |  | 0.6 |  |
| Effort | 465 | 62.5 | 22.22 |  | 1.1 |  |
| Motivate | 467 | 70.4 | 21.91 |  |  |  |
| Satis | 469 | 77.6 | 16.90 |  |  | 4.1 |
| Recomend | 461 | 74.5 | 25.73 |  |  |  |

Total Impact ← 512a

| Latent | Valid_N | Score | StdDev | Pooled | Satis | Recomend |
|---|---|---|---|---|---|---|
| R-square |  |  |  |  | 0.6 | 0.3 |
| Arsquare |  |  |  |  | 0.6 | 0.3 |
| Intercpt |  |  |  |  | -4.3 | 10.6 |
| Broch1 | 469 | 74.1 | 14.80 |  | 0.4 | 0.3 |
| Broch2 | 463 | 60.2 | 27.44 |  | 0.1 | 0.1 |
| Samples | 469 | 50.6 | 29.70 |  | 0.3 | 0.3 |
| Products | 469 | 82.2 | 13.90 |  | 1.0 | 0.8 |
| Advertis | 468 | 66.1 | 22.95 |  | 0.2 | 0.1 |
| Ordering | 469 | 83.4 | 14.14 |  | 0.3 | 0.3 |
| Deliv1 | 469 | 89.9 | 13.66 |  | 0.2 | 0.2 |
| Deliv2 | 469 | 86.7 | 15.33 |  |  |  |
| Shorts | 467 | 67.6 | 21.15 |  |  |  |
| Returns | 409 | 80.8 | 19.40 |  | 0.6 | 0.5 |
| Account | 469 | 88.7 | 14.73 |  |  |  |
| Service | 257 | 83.6 | 18.15 |  |  |  |
| Manager | 450 | 84.9 | 19.70 |  | 0.6 | 0.5 |
| Training | 455 | 79.2 | 20.03 |  | 0.6 | 0.5 |
| Effort | 465 | 62.5 | 22.22 |  | 1.1 | 0.9 |
| Motivate | 467 | 70.4 | 21.91 |  |  |  |
| Satis | 469 | 77.6 | 16.90 |  |  | 4.1 |
| Recomend | 461 | 74.5 | 25.73 |  |  |  |

FIG. 9a

Location: R:\TRAINSYS\SNAAP\P97_02    Report printed: 07/24/97 10:26:42

Model: SUF  Version: 01                                                          Run Report
Cut ID  000_00_2    Final Version [X]   Run ID A101                          Total    174
Selection Criteria  SEGMENT = 2                                              In Model 173
Labels: SEGMENT 2                              Weights Method CALC
1.                                             Impacts Method CALC
2.                                             Case Weighting [ ]
3.
4.
5.
6.

Direct Impact ← 508b

| Latent | Valid_N | Score | StdDev | Pooled | Satis | Recomend |
|---|---|---|---|---|---|---|
| R-square |  |  |  |  | 0.5 | 0.2 |
| Arsquare |  |  |  |  | 0.5 | 0.2 |
| Intercpt |  |  |  |  | -10.0 | 9.5 |
| Broch1 | 173 | 70.6 | 15.31 |  | 0.7 |  |
| Broch2 | 172 | 60.6 | 25.56 |  | 0.4 |  |
| Samples | 173 | 42.0 | 27.70 |  |  |  |
| Products | 173 | 81.4 | 13.99 |  | 0.5 |  |
| Advertis | 173 | 61.3 | 23.12 |  |  |  |
| Ordering | 173 | 85.2 | 13.35 |  | 0.9 |  |
| Deliv1 | 173 | 90.0 | 13.60 |  | 0.5 |  |
| Deliv2 | 173 | 82.9 | 15.38 |  |  |  |
| Shorts | 173 | 55.7 | 20.25 |  |  |  |
| Returns | 169 | 80.0 | 19.89 |  | 0.8 |  |
| Account | 173 | 90.7 | 14.24 |  |  |  |
| Service | 151 | 82.4 | 18.56 |  |  |  |
| Manager | 168 | 82.8 | 21.80 |  | 0.8 |  |
| Training | 172 | 81.4 | 18.72 |  | 0.4 |  |
| Effort | 173 | 61.2 | 18.71 |  | 0.7 |  |
| Motivate | 172 | 71.6 | 19.68 |  |  |  |
| Satis | 173 | 76.5 | 15.39 |  |  | 4.1 |
| Recomend | 172 | 72.5 | 25.45 |  |  |  |

Total Impact ← 512b

| Latent | Valid_N | Score | StdDev | Pooled | Satis | Recomend |
|---|---|---|---|---|---|---|
| R-square | 173 | 70.6 | 15.31 |  | 0.5 | 0.2 |
| Arsquare | 172 | 60.6 | 25.56 |  | 0.5 | 0.2 |
| Intercpt | 173 | 42.0 | 27.70 |  | -10.0 | 9.5 |
| Broch1 | 173 | 81.4 | 13.99 |  | 0.7 | 0.6 |
| Broch2 | 173 | 61.3 | 23.12 |  | 0.4 | 0.4 |
| Samples | 173 | 85.2 | 13.35 |  |  |  |
| Products | 173 | 90.0 | 13.60 |  | 0.5 | 0.4 |
| Advertis | 173 | 82.9 | 15.38 |  |  |  |
| Ordering | 173 | 55.7 | 20.25 |  | 0.9 | 0.7 |
| Deliv1 | 169 | 80.0 | 19.89 |  | 0.5 | 0.4 |
| Deliv2 | 173 | 90.7 | 14.24 |  |  |  |
| Shorts | 151 | 82.4 | 18.56 |  |  |  |
| Returns | 168 | 82.8 | 21.80 |  | 0.8 | 0.7 |
| Account | 172 | 81.4 | 18.72 |  |  |  |
| Service | 173 | 61.2 | 18.71 |  |  |  |
| Manager | 172 | 71.6 | 19.68 |  | 0.8 | 0.6 |
| Training | 173 | 76.5 | 15.39 |  | 0.4 | 0.4 |
| Effort | 172 | 72.5 | 25.45 |  | 0.7 | 0.6 |
| Motivate |  |  |  |  |  |  |
| Satis |  |  |  |  |  | 4.1 |
| Recomend |  |  |  |  |  |  |

FIG. 9b

Location: R:\TRAINSYS\SNAAP\P97_02

CFI Run Status Report

| Client: TRAINSYS | Project: SNAAP | Phase: P97 Q2 | Model: SUE (A1) | Version: 01 |
|---|---|---|---|---|

| Cut | Version | Total N | In_Model | PLS Weights | LV Scores | Impacts | Score Pooling | Impact Pooling |
|---|---|---|---|---|---|---|---|---|
| 000_00_001 | 01 | 480 | 469 | ☑ | ☑ | ☑ | | |
| 001_01_001 | 01 | 174 | 173 | ☑ | ☑ | ☑ | | |
| 001_01_002 | 01 | 156 | 156 | ☑ | ☑ | ☑ | | |
| 001_01_003 | 01 | 150 | 140 | ☑ | ☑ | ☑ | | |
| 002_01_001 | 01 | 12 | 12 | ☑ | ☑ | ☑ | | |
| 002_01_002 | 01 | 6 | 5 | ☑ | ☑ | ☑ | | |
| 002_01_003 | 01 | 33 | 33 | ☑ | ☑ | ☑ | | |
| 002_01_004 | 01 | 2 | 2 | | | ☑ | | |
| 002_01_005 | 01 | 65 | 65 | ☑ | ☑ | ☑ | | |
| 002_01_006 | 01 | 41 | 40 | ☑ | ☑ | ☑ | | |
| 002_01_007 | 01 | 29 | 29 | ☑ | ☑ | ☑ | | |
| 002_01_008 | 01 | 65 | 63 | ☑ | ☑ | ☑ | | |
| 002_01_009 | 01 | 51 | 47 | ☑ | ☑ | ☑ | | |
| 002_01_010 | 01 | 6 | 6 | ☑ | ☑ | ☑ | | |
| 002_01_011 | 01 | 15 | 15 | ☑ | ☑ | ☑ | | |
| 002_01_012 | 01 | 24 | 24 | ☑ | ☑ | ☑ | | |
| 002_01_013 | 01 | 0 | 0 | | | | | |
| 002_01_014 | 01 | 0 | 0 | | | | | |
| 002_01_015 | 01 | 0 | 0 | | | | | |
| 002_01_016 | 01 | 0 | 0 | | | | | |

Location: R:\TRAINSYS\SNAAP\P97_02   Report printed: 07/24/97 10:26:42   Page 1

FIG. 10

Model: SUF   Version: 01                                                                                    Diagnostic Report
Cut ID  000_00_001   Final Version ☒   Run ID A101                                                          Total  480
Selection Criteria                                                                                          In Model  469
Labels:                                                          Weights Method  CALC
1.                                                               Impacts Method  CALC
2.                                                               Case Weighting  ☐
3.
4.
5.
6.

128

Diagnostics (Module: PLS_C)

| LV | [MV_BLOCK_1] | VCase | Min | Max | RMean | RStdDev | PMean | PStdDev | StdWgt | StdLoad | UnWgt | UnLoad | Commun |
|---|---|---|---|---|---|---|---|---|---|---|---|---|---|
| | BROCH1 0.4836 | | | | | | | | | | | | |
| MV | BROCHUR1 | 469 | 1.0 | 10.0 | 7.8593 | 1.6568 | 76.21 | 18.41 | 0.30 | 0.7272 | 0.1805 | 1.2048 | 0.5288 |
| | BROCHUR2 | 468 | 1.0 | 10.0 | 8.3269 | 1.7258 | 81.41 | 19.18 | 0.30 | 0.7373 | 0.1741 | 1.2724 | 0.5436 |
| | BROCHUR3 | 469 | 1.0 | 10.0 | 8.2537 | 1.8827 | 80.60 | 20.92 | 0.22 | 0.5737 | 0.1161 | 1.0801 | 0.3291 |
| | BORCHUR4 | 468 | 1.0 | 10.0 | 7.5043 | 1.9540 | 72.27 | 21.71 | 0.32 | 0.7499 | 0.1651 | 1.4652 | 0.5623 |
| | BROCHUR5 | 458 | 1.0 | 10.0 | 5.9585 | 2.5017 | 55.09 | 27.80 | 0.29 | 0.6740 | 0.1149 | 1.6862 | 0.4543 |
| | BROCH2 0.6587 | | | | | | | | | | | | |
| | BROCHUR6 | 435 | 1.0 | 10.0 | 8.2368 | 2.6642 | 80.41 | 29.60 | 0.47 | 0.7150 | 0.1754 | 1.9050 | 0.5113 |
| | BROCHUR7 | 435 | 1.0 | 10.0 | 5.0299 | 2.9436 | 44.78 | 32.71 | 0.74 | 0.8978 | 0.2520 | 2.6428 | 0.8061 |
| | SAMPLES C.8337 | | | | | | | | | | | | |
| | SAMPLE1 | 465 | 1.0 | 10.0 | 5.8903 | 3.0546 | 54.34 | 33.94 | 0.50 | 0.8970 | 0.1633 | 2.7400 | 0.8046 |
| | SAMPLE2 | 454 | 1.0 | 10.0 | 5.2511 | 2.8125 | 47.23 | 31.25 | 0.60 | 0.9288 | 0.2116 | 2.6124 | 0.8627 |
| | PRODUCTS C.5583 | | | | | | | | | | | | |
| | PRODUCT1 | 468 | 1.0 | 10.0 | 8.7821 | 1.4719 | 86.47 | 16.35 | 0.35 | 0.7681 | 0.2398 | 1.1306 | 0.5900 |
| | PRODUCT2 | 467 | 1.0 | 10.0 | 7.9615 | 1.7526 | 77.35 | 19.47 | 0.36 | 0.8039 | 0.2068 | 1.4088 | 0.6462 |
| | PRODUCT3 | 469 | 1.0 | 10.0 | 8.3070 | 1.8221 | 81.19 | 20.25 | 0.34 | 0.7504 | 0.1891 | 1.3673 | 0.5631 |
| | PRODUCT4 | 466 | 1.0 | 10.0 | 8.5086 | 1.5798 | 83.43 | 17.55 | 0.27 | 0.6587 | 0.1720 | 1.0405 | 0.4338 |
| | ADVERTIS C.7630 | | | | | | | | | | | | |
| | ADVER1 | 458 | 1.0 | 10.0 | 6.0721 | 2.5332 | 56.36 | 28.15 | 0.55 | 0.8619 | 0.2163 | 2.1834 | 0.7429 |
| | ADVER2 | 466 | 1.0 | 10.0 | 7.6137 | 2.2058 | 73.49 | 24.51 | 0.60 | 0.8849 | 0.2704 | 1.9520 | 0.7831 |
| | ORDERING 0.4307 | | | | | | | | | | | | |
| | ORDER1 | 467 | 1.0 | 10.0 | 8.8630 | 1.7562 | 87.37 | 19.51 | 0.38 | 0.5928 | 0.2145 | 1.0410 | 0.3514 |
| | ORDER2 | 468 | 1.0 | 10.0 | 9.2521 | 1.3317 | 91.69 | 14.80 | 0.27 | 0.5650 | 0.2032 | 0.7525 | 0.3193 |
| | ORDER3 | 466 | 1.0 | 10.0 | 8.1330 | 2.2054 | 79.26 | 24.50 | 0.43 | 0.7704 | 0.1967 | 1.6990 | 0.5935 |
| | BROCHUR8 | 462 | 1.0 | 10.0 | 7.6212 | 2.4392 | 73.57 | 27.10 | 0.43 | 0.6772 | 0.1753 | 1.6519 | 0.4586 |
| | DELIV1 0.5882 | | | | | | | | | | | | |
| | DELIVER1 | 468 | 1.0 | 10.0 | 8.7158 | 1.7592 | 85.73 | 19.55 | 0.51 | 0.8403 | 0.2895 | 1.4782 | 0.7061 |
| | DELIVER2 | 468 | 1.0 | 10.0 | 9.3056 | 1.3612 | 92.28 | 15.12 | 0.51 | 0.8768 | 0.3724 | 1.1936 | 0.7688 |
| | DELIVER3 | 410 | 1.0 | 10.0 | 9.2829 | 1.4628 | 92.03 | 16.25 | 0.24 | 0.5381 | 0.1621 | 0.7872 | 0.2896 |
| | DELIV2 0.7299 | | | | | | | | | | | | |
| | DELIVER4 | 469 | 1.0 | 10.0 | 8.8657 | 1.5747 | 87.40 | 17.50 | 0.57 | 0.8482 | 0.3644 | 1.3357 | 0.7194 |
| | DELIVER5 | 469 | 1.0 | 10.0 | 8.7441 | 1.6546 | 86.05 | 18.38 | 0.60 | 0.8605 | 0.3605 | 1.4237 | 0.7404 |
| | SHORTS 0.6132 | | | | | | | | | | | | |
| | SHORTS1 | 465 | 1.0 | 10.0 | 7.9484 | 1.9280 | 77.20 | 21.42 | 0.30 | 0.7825 | 0.1563 | 1.5086 | 0.6123 |
| | SHORTS2 | 363 | 1.0 | 10.0 | 6.6639 | 2.3675 | 62.93 | 26.31 | 0.34 | 0.8589 | 0.1422 | 2.0335 | 0.7378 |
| | SHORTS3 | 281 | 1.0 | 10.0 | 6.4698 | 2.6846 | 60.78 | 29.83 | 0.35 | 0.7756 | 0.1290 | 2.0822 | 0.6016 |
| | SHORTS4 | 430 | 1.0 | 10.0 | 5.6837 | 2.6174 | 52.04 | 29.08 | 0.29 | 0.7080 | 0.1113 | 1.8532 | 0.5013 |
| | RETURNS 0.6406 | | | | | | | | | | | | |

Location: R:\TRAINSYS\SNAAP\P97_02\          Report printed: 07/24/97 10:15:09          Page 1

FIG. 11a

Model: SUF    Version: 01                                          Diagnostic Report
Cut ID  000_00_001   Final Version ☒   Run ID A101              Total      480
Selection Criteria                                               In Model   469
Labels:                              Weights Method  CALC
1.
2.                                   Impacts Method  CALC
3.                                   Case Weighting ☐
4.
5.
6.

| | | | | | |
|---|---|---|---|---|---|
| MANAGER3 | 0.9088 | | | | |
| MANAGER4 | 0.9225 | | | | |
| MANAGER5 | 0.9150 | | | | |
| MANAGER6 | 0.9167 | | | | |
| TRAINING | 0.7196 | | | | |
| TRAIN2 | 0.5804 | | | | |
| TRAIN3 | 0.6394 | | | | |
| TRAIN4 | 0.6706 | | | | |
| EFFORT | 0.7410 | | | | |
| EFFORT1 | 0.7048 | | | | |
| EFFORT2 | 0.6284 | | | | |
| EFFORT3 | 0.6320 | | | | |
| MOTIVATE | 0.9038 | | | | |
| MOTIVAT1 | 0.8906 | | | | |
| MOTIVAT2 | 0.8850 | | | | |
| MOTIVAT3 | 0.8771 | | | | |
| MOTIVAT4 | 0.8789 | | | | |
| MOTIVAT5 | 0.8960 | | | | |
| MOTIVAT7 | 0.8920 | | | | |
| SATIS | 0.8121 | | | | |
| SATIS1 | 0.7087 | | | | |
| SATIS2 | 0.7269 | | | | |
| SATIS3 | 0.7885 | | | | |
| RECOMEND | | | | | |

— 540

[RELIABILITY] — 544

[LVBLOCK_EIGENVALUES]

| | | | | | |
|---|---|---|---|---|---|
| BROCH1 | 2.4199 | 0.8785 | 0.7219 | 0.5223 | 0.4574 |
| BROCH2 | 1.3341 | 0.6659 | | | |
| SAMPLES | 1.6694 | 0.3306 | | | |
| PRODUCTS | 2.2346 | 0.7623 | 0.5743 | 0.4288 | |
| ADVERTIS | 1.5266 | 0.4734 | | | |
| ORDERING | 1.7338 | 1.1131 | 0.6387 | 0.5144 | |
| DELIV1 | 1.7796 | 0.8014 | 0.4190 | | |
| DELIV2 | 1.4600 | 0.5400 | | | |
| SHORTS | 2.4554 | 0.6375 | 0.5616 | 0.3455 | |
| RETURNS | 2.5633 | 0.7528 | 0.4223 | 0.2617 | |
| ACCOUNT | 2.5862 | 0.6721 | 0.5265 | 0.2152 | |
| SERVICE | 3.3717 | 0.6332 | 0.4972 | 0.3272 | 0.1707 |
| MANAGER | 4.4361 | 0.4891 | 0.3924 | 0.3095 | 0.2293 | 0.1437 |
| TRAINING | 1.9232 | 0.5945 | 0.4823 | | |
| EFFORT | 1.9773 | 0.5669 | 0.4558 | | |
| MOTIVATE | 4.0587 | 0.7824 | 0.4351 | 0.4076 | 0.1737 | 0.1426 |
| SATIS | 2.1815 | 0.4707 | 0.3478 | | |
| RECOMEND | | | | | |

[LVBLOCK_EIGENVALUES] — 548

[OVERALL_FIT_MEASURES]

| | |
|---|---|
| Df | 17.69 |
| AvgCommunalities | 0.7979 |
| RmsTheta | 0.0398 |
| RmsMvCov | 0.2988 |
| RmsMvCovExplained | 0.8669 |
| RmsLvCor | 0.4193 |
| RmsPsi | 0.3693 |
| AvgR2 | 0.4440 |
| RmsLvCorrExplained | 0.1192 |
| RmsFit | 0.0196 |

Location: R:\TRAINSYS\SNAAP\P97_02\    Report printed: 07/24/97 10:15:09    Page 7

FIG. 11b

Errors (Module: PLS_C)

```
———Exception———
Module: "PlsMatrixBinder" of type cfiMatricesToModel
File: C:\users\cku\projects\cfidev\xprojects\cle\cfiMatricesToModel.cpp
Line: 1093
Message:
Weights have mixed sign.
LV: COMM
MVs: Q1_4=0.8204831; Q10=-0.137222;Q11=0.2714238; Q12=-0.1814729
```

FIG. 12a

Warning (Module: PLS_C)

———Exception———
Module: "LoadingsBinder" of type cfiLoadingsToModel
File: C:\users\cku\projects\cfidev\xprojects\cle\cfiLoadingsToModel.cpp
Line: 62
Message:
E00044: Marking loadings bad in the model. Reason: the following error occurred:
———Exception———
Module: "ModuleToWeightMatricies" of type cfiModelToWeightMatricies
File: C:\users\cku\projects\cfidev\xprojects\cle\cfiModelToWeightMatricies.cpp
Line: 72
Message:
E00041 : Can't treate weight matrix from model: one or more weights are marked bad.

FIG. 12b

Diagnostics (Module: LVSCORE)

[LV_BLOCK]

| | MV# | VCase | Min | Max | Mean | StdDev |
|---|---|---|---|---|---|---|
| BROCH1 | 5 | 469 | 0.8 | 7.5 | 74.07 | 14.80 |
| BROCH2 | 2 | 463 | 0.4 | 4.3 | 60.17 | 27.44 |
| SAMPLES | 2 | 469 | 0.4 | 3.7 | 50.64 | 29.70 |
| PRODUCTS | 4 | 469 | 0.8 | 8.1 | 82.17 | 13.90 |
| ADVERTIS | 2 | 468 | 0.5 | 4.9 | 66.13 | 22.95 |
| ORDERING | 4 | 469 | 0.8 | 7.9 | 83.43 | 14.14 |
| DELIV1 | 3 | 469 | 0.8 | 8.2 | 89.88 | 13.66 |
| DELIV2 | 2 | 469 | 0.7 | 7.2 | 86.72 | 15.33 |
| SHORTS | 4 | 467 | 0.5 | 5.4 | 67.56 | 21.15 |
| RETURNS | 4 | 409 | 0.6 | 5.8 | 80.79 | 19.40 |
| ACCOUNT | 4 | 469 | 0.8 | 7.8 | 88.65 | 14.73 |
| SERVICE | 5 | 257 | 0.6 | 6.1 | 83.57 | 18.15 |
| MANAGER | 6 | 450 | 0.6 | 5.9 | 84.90 | 19.70 |
| TRAINING | 3 | 455 | 0.6 | 5.8 | 79.19 | 20.03 |
| EFFORT | 3 | 465 | 0.5 | 5.1 | 62.48 | 22.22 |
| MOTIVATE | 6 | 467 | 0.5 | 5.1 | 70.39 | 21.91 |
| SATIS | 3 | 469 | 0.7 | 6.6 | 77.63 | 16.90 |
| RECOMEND | 1 | 461 | 0.4 | 4.3 | 74.45 | 25.73 |

[LV_BLOCK]

[COLLINEARITY]
SATIS

| Order | EigenVal | Cond_Num | Constant | BROCH1 | BROCH2 | SAMPLES | PRODUCTS | ADVERTIS | ORDERING | DELIV1 |
|---|---|---|---|---|---|---|---|---|---|---|
| 1 | 15.26374 | 1.00000 | 0.00005 | 0.00007 | 0.00038 | 0.00043 | 0.00005 | 0.00021 | 0.00007 | 0.00007 |
| 2 | 0.25607 | 7.72055 | 0.00213 | 0.00012 | 0.06868 | 0.26063 | 0.00048 | 0.00379 | 0.00101 | 0.00224 |
| 3 | 0.08894 | 13.10051 | 0.00066 | 0.00105 | 0.76786 | 0.13515 | 0.00036 | 0.05143 | 0.00230 | 0.00071 |
| 4 | 0.07410 | 14.35201 | 0.00475 | 0.00030 | 0.03192 | 0.33406 | 0.00000 | 0.21449 | 0.00206 | 0.00652 |
| 5 | 0.05647 | 16.44010 | 0.00023 | 0.00056 | 0.05863 | 0.12070 | 0.00079 | 0.07712 | 0.00612 | 0.00012 |
| 6 | 0.04963 | 17.53679 | 0.00360 | 0.00970 | 0.00026 | 0.00642 | 0.00350 | 0.24248 | 0.00038 | 0.00123 |
| 7 | 0.04108 | 19.27585 | 0.00138 | 0.00047 | 0.00324 | 0.00016 | 0.00023 | 0.09323 | 0.00199 | 0.00915 |
| 8 | 0.03413 | 21.14797 | 0.00000 | 0.01842 | 0.02482 | 0.00266 | 0.01048 | 0.07659 | 0.00221 | 0.00196 |
| 9 | 0.03053 | 22.36046 | 0.00497 | 0.00056 | 0.03596 | 0.00562 | 0.07150 | 0.01481 | 0.02150 | |
| 10 | 0.02260 | 25.98917 | 0.01222 | 0.14803 | 0.01810 | 0.06916 | 0.00491 | 0.05454 | 0.07432 | 0.00341 |
| 11 | 0.01911 | 28.26368 | 0.00205 | 0.27855 | 0.00403 | 0.00467 | 0.04566 | 0.07719 | 0.01832 | 0.00548 |
| 12 | 0.01606 | 30.82642 | 0.00405 | 0.07741 | 0.00020 | 0.00348 | 0.01428 | 0.02226 | 0.03129 | 0.46131 |
| 13 | 0.01514 | 31.75312 | 0.00960 | 0.00064 | 0.00000 | 0.00607 | 0.00016 | 0.00773 | 0.27720 | 0.23050 |
| 14 | 0.01363 | 33.46614 | 0.00271 | 0.01632 | 0.01641 | 0.00034 | 0.03455 | 0.00323 | 0.51529 | 0.00387 |
| 15 | 0.01010 | 38.88340 | 0.01466 | 0.43139 | 0.00181 | 0.00245 | 0.78259 | 0.00191 | 0.00143 | 0.03148 |
| 16 | 0.00868 | 41.94591 | 0.91617 | 0.01201 | 0.00310 | 0.01768 | 0.09633 | 0.00229 | 0.05120 | 0.22045 |

| Order | DELIV2 | SHORTS | RETURNS | ACCOUNT | SERVICE | MANAGER | TRAINING | EFFORT |
|---|---|---|---|---|---|---|---|---|
| 1 | 0.00008 | 0.00019 | 0.00015 | 0.00007 | 0.00011 | 0.00015 | 0.00014 | 0.00022 |

FIG. 13a

|    |         |         |         |         |         |         |         |         |
|----|---------|---------|---------|---------|---------|---------|---------|---------|
| 2  | 0.00097 | 0.00082 | 0.00179 | 0.00185 | 0.00496 | 0.00133 | 0.00023 | 0.00428 |
| 3  | 0.00000 | 0.03024 | 0.00186 | 0.00097 | 0.00116 | 0.00021 | 0.00074 | 0.01227 |
| 4  | 0.00677 | 0.00850 | 0.00579 | 0.00392 | 0.00028 | 0.00013 | 0.00415 | 0.23116 |
| 5  | 0.00862 | 0.40961 | 0.00726 | 0.00981 | 0.00057 | 0.00126 | 0.04985 | 0.12578 |
| 6  | 0.00142 | 0.14477 | 0.02453 | 0.00000 | 0.04877 | 0.06129 | 0.03470 | 0.30291 |
| 7  | 0.00261 | 0.00082 | 0.22215 | 0.00126 | 0.01280 | 0.41265 | 0.02774 | 0.12533 |
| 8  | 0.00090 | 0.02331 | 0.39671 | 0.00304 | 0.06281 | 0.08638 | 0.27277 | 0.01235 |
| 9  | 0.02598 | 0.11741 | 0.15029 | 0.00079 | 0.02412 | 0.18297 | 0.37369 | 0.00703 |
| 10 | 0.00988 | 0.08178 | 0.00071 | 0.00231 | 0.55616 | 0.08598 | 0.00008 | 0.07031 |
| 11 | 0.12258 | 0.01984 | 0.08820 | 0.21180 | 0.09199 | 0.03174 | 0.07868 | 0.00575 |
| 12 | 0.40498 | 0.07365 | 0.01941 | 0.00515 | 0.00000 | 0.02827 | 0.02292 | 0.00031 |
| 13 | 0.23506 | 0.03333 | 0.06880 | 0.12813 | 0.12747 | 0.09526 | 0.07832 | 0.08174 |
| 14 | 0.10522 | 0.01585 | 0.00076 | 0.51378 | 0.00267 | 0.01178 | 0.04042 | 0.00348 |
| 15 | 0.00695 | 0.02447 | 0.00378 | 0.05336 | 0.04340 | 0.00010 | 0.00381 | 0.00078 |
| 16 | 0.06799 | 0.01543 | 0.00782 | 0.06375 | 0.02274 | 0.00052 | 0.01176 | 0.01630 |

[COLLINEARITY]

FIG. 13b

| | |
|---|---|
| RmsResidual | 0.3072 |
| UlsgoodnessOfFit | 0.1308 |
| UlsAdjustedGoodnesOfFit | 0.0094 |
| UlsParsimonyGoodnessOfFit | 0.1148 |
| [OVERALL_FIT_MEASURES] | |

FIG. 13c

Diagnostics (Module: IMPACT)

```
[LV_CORR]
*SATIS*

BROCH1   BROCH2   SAMPLES  PRODUCTS ADVERTIS ORDERING DELIV1   DELIV2   SHORTS   RETURNS  ACCOUNT
SERVICE  MANAGER TRAINING   EFFORT      SATIS
   BROCH1         1   0.405999  0.488304  0.643728  0.588516  0.409139  0.28311   0.387398  0.503995  0.34572   0.295249
0.349061  0.363809  0.52261   0.513804  0.569999
   BROCH2    0.405999        1   0.584972  0.348108  0.420213  0.390283  0.219407  0.321836  0.374769  0.320945  0.256327
0.21481   0.292043  0.362006  0.467677  0.438381
   SAMPLES   0.488304  0.584972        1   0.434912  0.503779  0.343516  0.206938  0.371733  0.51074   0.343857  0.260972
0.321485  0.318667  0.414408  0.513426  0.499382
   PRODUCTS  0.643728  0.348108  0.434912        1   0.542304  0.424875  0.339918  0.41548   0.434208  0.372441  0.397247
0.452457  0.372183  0.562644  0.518241  0.621487
   ADVERTIS  0.588516  0.420213  0.503779  0.542304        1   0.31777   0.235793  0.366091  0.490302  0.34917   0.257596
0.359225  0.368857  0.470735  0.570334  0.531891
   ORDERING  0.409139  0.390283  0.343516  0.424875  0.31777         1   0.31163   0.343965  0.315411  0.455311  0.459148
0.342894  0.267613  0.405624  0.447902  0.475103
   DELIV1    0.28311   0.219407  0.206938  0.339918  0.235793                   1   0.334206  0.319373  0.314465  0.292641
0.381928  0.364079  0.258024  0.264388  0.350965
   DELIV2    0.387398  0.321836  0.371733  0.41548   0.366091  0.343965  0.334206        1   0.540913  0.346481  0.355346
0.440168  0.324478  0.303189  0.364459  0.375453
   SHORTS    0.503995  0.374769  0.51074   0.434208  0.490302  0.315411  0.319373  0.540913        1   0.383773  0.257128
0.473285  0.34905   0.334352  0.442319
   RETURNS   0.34572   0.320945  0.343857  0.372441  0.34917   0.455311  0.314465  0.346481  0.38373         1   0.457812
0.419673  0.283579  0.366586  0.372041  0.462712
   ACCOUNT   0.295249  0.256327  0.260972  0.397247  0.257596  0.459148  0.292641  0.355346  0.257128  0.457812        1
0.370045  0.292679  0.42489   0.37046   0.398193
   SERVICE   0.349061  0.21481   0.321485  0.452457  0.359225  0.342894  0.381928  0.440168  0.473285  0.419673  0.370045
1   0.326527  0.330444  0.356055  0.346107
   MANAGER   0.363809  0.292043  0.318667  0.372183  0.368857  0.267613  0.364079  0.324478  0.34905   0.283579  0.292679
0.326527        1   0.358858  0.374114  0.459467
```

|         |         |          |          |          |          |          |          |          |          |          |         |
|---------|---------|----------|----------|----------|----------|----------|----------|----------|----------|----------|---------|
| TRAINING | 0.52261 | 0.362006 | 0.414408 | 0.562644 | 0.470735 | 0.405624 | 0.258024 | 0.303189 | 0.334352 | 0.366586 | 0.42489 |
| 0.330444 | 0.358858 | 1 | 0.486806 | 0.563399 | | | | | | | |
| EFFORT | 0.513804 | 0.467677 | 0.513426 | 0.518241 | 0.570334 | 0.447902 | 0.264388 | 0.364459 | 0.442319 | 0.372041 | 0.37046 |
| 0.356055 | 0.374114 | 0.486806 | 1 | 0.622009 | | | | | | | |
| SATIS | 0.569999 | 0.438381 | 0.499382 | 0.621487 | 0.531891 | 0.475103 | 0.350965 | 0.375453 | 0.4285 | 0.462712 | 0.398193 |
| 0.321485 | 0.318667 | 0.414408 | 0.513426 | 0.499382 | | | | | | | |
| 0.346107 | 0.459467 | 0.563399 | 0.622009 | | | | | | | | |

*RECOMEND*

|  | SATIS | RECOMEND |
|---|---|---|
| SATIS | 1 | 0.539875 |
| RECOMEND | 0.539875 | 1 |

[LV_CORR]

[PATH_COEFFICIENT]

| *SATIS | Path_Coef | 95%_CI_Beta | Direct_Impact | 95%_CI_Impact |
|---|---|---|---|---|
| BROCH1 | 0.07432 | 0.12261 | 0.42432 | 0.70003 |
| BROCH2 | 0.02045 | 0.10739 | 0.06297 | 0.33066 |
| SAMPLES | 0.07688 | 0.11565 | 0.21873 | 0.32904 |
| PRODUCTS | 0.21867 | 0.12316 | 1.32890 | 0.74849 |
| ADVERTIS | 0.03835 | 0.11659 | 0.14117 | 0.42916 |
| ORDERING | 0.07172 | 0.10529 | 0.42842 | 0.62896 |
| DELIV1 | 0.05834 | 0.09531 | 0.36081 | 0.58940 |
| DELIV2 | -0.00682 | 0.10499 | -0.03760 | 0.57880 |
| SHORTS | -0.00626 | 0.11555 | -0.02502 | 0.46161 |
| RETURNS | 0.12816 | 0.10315 | 0.55825 | 0.44930 |
| ACCOUNT | 0.00468 | 0.10353 | 0.02683 | 0.59407 |
| SERVICE | -0.08293 | 0.10507 | -0.38616 | 0.48928 |
| MANAGER | 0.12953 | 0.09654 | 0.55571 | 0.41418 |
| TRAINING | 0.12518 | 0.10993 | 0.52801 | 0.46367 |
| EFFORT | 0.22801 | 0.11507 | 0.86724 | 0.43767 |
| *RECOMEND* | Path_Coef | 95%_CI_Beta | Direct_Impact | 95%_CI_Impact |
| SATIS | 0.53987 | 0.07701 | 4.10988 | 0.58623 |

[PATH_COEFFICIENT]

[SM_BLOCK]

|  | R-SQUARE | AR-SQUARE | INTERCEPT |
|---|---|---|---|
| SATIS | 0.5997 | 0.5734 | 0.3421 |
| RECOMEND | 0.2915 | 0.2899 | 10.6443 |

[SM_BLOCK]

FIG. 14b

STATISTICAL IMPACT ANALYSIS COMPUTER SYSTEM

BACKGROUND AND SUMMARY OF THE INVENTION

The present invention relates generally to statistical analysis computer systems. More particularly, the present invention relates to statistical impact analysis computer systems.

The desire to improve quality has spread to nearly all manufacturing and service industries, business and social organizations and government. Today there is great interest in improving quality of products, services and the environment through systematic performance evaluation followed by business process improvement. Some (but admittedly few) industries are fortunate to have easily quantifiable metrics to measure the quality of their products and services. Using these metrics a continuous improvement process can be implemented, whereby (a) the product or service is produced using existing processes and assessed using quantifiable metrics, (b) the existing processes are then changed based on the results of the metrics, and (c) the efficacy of the change is tested by producing the product or service again using the changed process and assessing using the same metrics.

For most industries, however, finding a good, quantifiable metric has proven quite elusive. For most industries, business processes have become quite complex and quite hard to describe in quantitative terms. Human intuition and judgment play an important role in production of goods and services; and ultimately human satisfaction plays the decisive role in determining which goods and services sell well and which do not. In addition, there is a growing body of evidence suggesting that employee on-the-job satisfaction also has an enormous impact upon a company's bottom line.

Human intuition and judgment, customer satisfaction, employee satisfaction. These are intangible variables that are not directly measurable and must therefore be inferred from data that are measurable. Therein lies the root of a major problem in applying continuous improvement techniques to achieve better quality. The data needed to improve quality are hidden, often deeply within reams of data the organization generates for other purposes. Even surveys expressly designed to uncover this hidden data can frequently fail to produce meaningful results unless the data are well understood and closely monitored.

Experts in statistical analysis know to represent such intangible variables as "latent variables" that are derived from measurable variables, known as "manifest variables." However, even experts in statistical analysis cannot say that manifest variable A will always measure latent variable B. The relationship is rarely that direct. More frequently, the relationship between manifest variable A and latent variable B involves a hypothesis, which must be carefully tested through significant statistical analysis before being relied upon.

The current state of the art is to analyze these hypotheses on a piecemeal basis, using statistical analysis packages such as SPSS or SAS. However, these packages are not designed or intended for the casual user. These packages lack a semi-automated (let alone an automated mechanism) for examining the "manifest" variables (i.e., measured survey data) within many different cuts or segments. Also, these packages have difficulty dealing with surveys where the data are incomplete or few responses have been gathered.

Moreover, these packages lack a cohesive semi-automated mechanism for determining the impact of these measured manifest variables upon "latent" variables (such as customer satisfaction) which cannot be directly measured due to their intangible nature.

The present invention is directed to overcoming these and other disadvantages of previous systems. In accordance with the teachings of the present invention, a computer-implemented apparatus and method is provided for determining the impacts of predetermined customer characteristics associated with measured physical attributes. A manifest variable database is utilized for storing manifest variable data that is indicative of the measured physical attributes. A partial least squares determinator is connected to the manifest variable database for determining statistical weights based upon the stored manifest variable data. A weights database which is connected to the partial lease squares determinator is utilized for storing the determined weights.

A latent variable determinator is connected to the weighting database for determining scores for latent variables based upon the stored manifest variables and upon the stored weights. The latent variables are indicative of the predetermined customer characteristics. Additionally, a latent variable database is connected to the latent variable score determinator for storing the determined latent variable scores. An impact determinator is connected to the latent variable database for determining impact relationships among the latent variables based upon the stored latent variable scores.

For a more complete understanding of the invention, its objects and advantages, reference may be had to the following specification and to the accompanying drawings.

BRIEF DESCRIPTION OF THE DRAWINGS

FIG. 6 is an exemplary report illustrating the data values selected for a particular execution of the present invention;

FIG. 7 is a computer screen display that lists exemplary manifest and latent variable names and descriptions;

FIGS. 8a–8b are run reports illustrating the manifest and latent data results for a particular data cut;

FIGS. 9a–9b depict an exemplary report of the impact data results;

FIG. 10 depicts an exemplary Run Status report;

FIGS. 11a–11b depict an exemplary computer output report illustrating diagnostic results for the PLS software module;

FIGS. 12a–12b are exemplary computer output reports illustrating error reports for the PLS software module;

FIGS. 13a–13c depict an exemplary computer output report illustrating diagnostic results for the LV score software module; and FIGS. 14a–14b depict an exemplary computer output report illustrating diagnostic results for the impact software module.

DETAILED DESCRIPTION OF THE PREFERRED EMBODIMENT(S)

Figure 1:
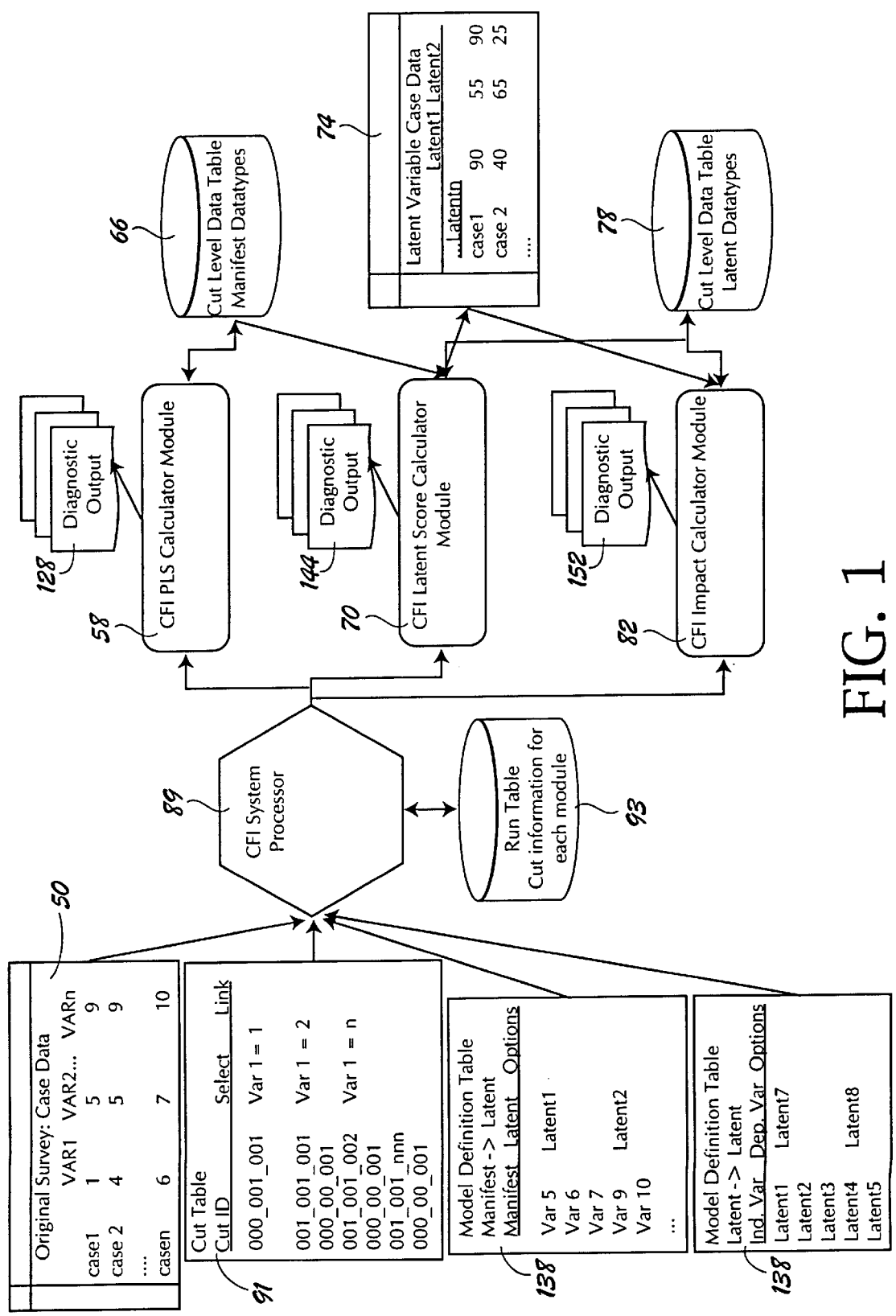
FIG. 1 is a software block diagram illustrating the top level software modules for performing customer profiling analysis.

With reference to FIG. 1, there is shown the top-level software modules of the present invention. The software modules process customer profile case data 50 in order to determine their impacts upon predetermined customer characteristics (e.g., customer satisfaction). Typically, case data 50 contains the responses to customer survey forms that customers are asked to complete. The surveys may ask, for example, the customer to indicate on a scale from 1–10 their levels of satisfaction relative to certain attributes associated with a store. One such attribute might be whether a product from the store had delivered the store's product to the customer in a timely fashion.

The present invention utilizes a novel modular software structure in order to ascertain the impacts between manifest variables and latent variables and the impacts between latent variables. Within the field of the present invention, manifest variable are variables whose values can be directly measured. For example, while customer satisfaction cannot be directly measured (and hence is viewed as a latent variable), variables, such as the delivery time of a product to a customer, can be directly measured since they are physical attributes or manifestations. These measured variables are viewed within the present invention as manifest variables.

The first software module of the present invention is a partial least squares (PLS) software module 58 that determines partial least square-related statistical measures based upon case data 50. PLS software module 58 determines the optimal weights that should be used in analyzing the case data 50. In the preferred embodiment, the PLS data output is stored in a relational database, such as, Microsoft Access. Within this embodiment, the data output is stored in the data_M table 66.

A latent variable score software module 70 uses the PLS data output, case data 50, and model specifications 138 to produce latent variable-related data outputs 74. One of the primary outputs of the LV score software module 70 is the latent variable score which indicates a standard score, typically from 0 to 100, indicating perceived level of performance. The LV score data output 74 is preferably stored in data_L table 78 which is accessible to the next software module of the present invention—that is, the Impact software module 82.

Impact software module 82 determines impact data results using the latent variable-related data outputs 74, case data 50 and model specifications 138. Impact data results determine which particular manifest or latent variables were most important.

PLS software module 58, LV score software module 70 and impact software module 82 provide for a modular design wherein the data results at the users request can be viewed upon execution of each software module. If the user determines that execution of a particular module is not within a predefined threshold, then the user uses the novel structure of the present invention to rerun the software module with different data and then use that data in the subsequent software modules.

A user employs system processor 89 to establish what data from the customer profile case data 50 is to be used for a particular run. The identifying data for a particular run (or cut) is stored in cut table 91. Since software modules 58, 70, and 82 can use different cut data, the particular cut information for each software module is stored in run table 93.

Moreover, the present invention provides diagnostic rules associated with each software module in order to assist the user to detect out-of-tolerance conditions by generating diagnostic outputs 128, 144, and 152 for each software module.

Figure 2A:
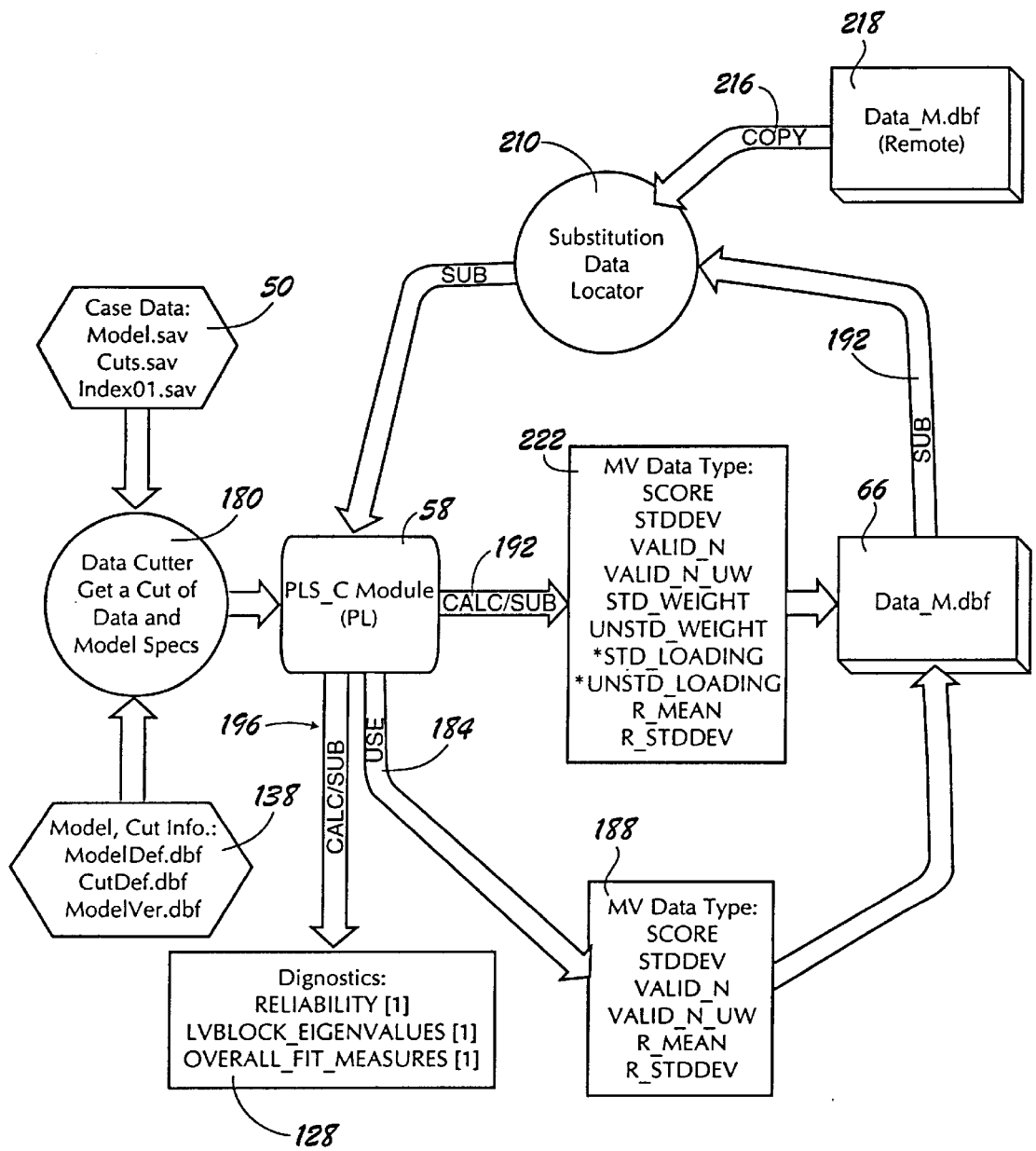
FIG. 2a is a software block diagram illustrating the data flow and methods for the PLS software module.

FIG. 2a depicts the software implementation of the preferred embodiment for the PLS software module 58. PLS software module 58 obtains the desired case data 50 and model specifications 138 via data cutter 180. Moreover, model specifications 138 are used to indicate the relationship between the manifest variables and the latent variables.

After data cutter 180 has supplied to the PLS software module 58 the appropriate case data 50 and appropriate model specification data 138, the PLS software module 58 utilizes methods within an object-oriented environment to perform a PLS weight substitution determination function. For example, PLS software module 58 employs the "use" method as depicted at reference numeral 184 in order to generate the following PLS data output 188: score, standard deviation, valid "n" weighted and unweighted, R mean, and R standard deviation.

The "sub" method as depicted by reference numeral 192 allows the PLS software module 58 to substitute data from other data sets in order to perform the PLS weight substitution determination function. The "calc" method as depicted at reference numeral 196 indicates that calculations involving substituted data should commence. The "calc'sub" methods are used together in the following manner. When the PLS software module 58 determines that superset data needs to be used for determination of PLS weights, then the "sub" method is utilized for performing the substitution. After the substitution, the PLS software module 58 utilizes the "calc" method to then perform calculations based upon the substituted data set. Methods (such as calc method 192) produce the data within the box to which the method's arrow points.

The PLS software module 58 determines that a substitution is to occur by examining whether the number of samples within a cut of case data is below a predetermined threshold which, in the preferred embodiment, is one hundred samples. If data substitution is to occur, then the PLS software module 58 invokes the sub method 206 which indicates to the substitution data locator 210 that superset data is to be copied from a database. In the preferred embodiment, the substitution data locator software module 210 utilizes a copy method 214 in order to retrieve superset data from a remote data_M database 218. The term "remote" refers to storing superset data in an "offline" database separate from the main database of data_M table 66 and data_L table 78 (not shown). The historical superset data is stored in remote data_M database 218 in order to keep the size of the main databases from becoming too large since the present invention is continually adding historical data to its knowledge base.

If the PLS software module 58 is utilizing substituted data, then block 222 is invoked wherein the following manifest data is produced and stored in data_M table 66: score, standard deviation, valid N, valid N unweighted, standard weight, unstandardized weight, standardized loading, unstandardized loading, R mean, R standard deviation.

Score refers to a standard score, typically from 0 to 100 indicating the main responses from the questionaire. Standard deviation refers to the standard statistical measure of dispersion. Valid N refers to a standard statistical term for numbered usable cases. Valid N unweighted refers to a standard statistical term for numbered usable cases before weighting. R mean refers to a standard statistical term for the amount of variance accounted for by the analysis. R standard deviation refers to a standard statistical term for the standard deviation of the raw mean. The data type standardized and unstandardized weights refer to the calculation of the contention that the manifest variable makes to the associated latent variables. The manifest variable data types standardized loading and unstandardized loading refer to the correlation between manifest and latent variable scores.

If the PLS software module 58 determines that data substitution is not needed, then block 188 is executed by the "use" method 184. The data generated by block 188 is conceptually similar to the data generated by block 222 except that the weights-related statistical measures and the loading-related statistical measures are not generated since data substitution was not performed. The output of block 188 is stored in the data_M table 66.

Irrespective of whether data substitution is performed, diagnostics as generated by diagnostics block 128 is generated. PLS diagnostics rules 128 generates diagnostic information at various levels and which are unique to the PLS software module 58. The diagnostic levels vary from Level 0 (which terminates the execution of the PLS software module 58 only for the most severe errors) up to Level 2 (wherein processing of the PLS software module 58 terminates upon encountering lower threshold types of errors). Diagnostic level 1 is preferably set as the default.

The diagnostics allow the present invention to obtain the maximum amount of information from a run (even if the run fails in some manner) since the diagnostics indicate in detail how far execution had proceeded before the failure was encountered.

For the PLS software module 58, the following diagnostics are utilized: reliability, LV block eigen values, and overall fit measures. The reliability diagnostic measures indicate chronback's alpha, a standard statistical measure. The latent variable block eigen values indicate a standard statistical measure to show the magnitude of manifest loadings on its associated latent. The overall fit measures indicate the degree of between the actual covariance data and the estimated convariance data.

Figure 2B:
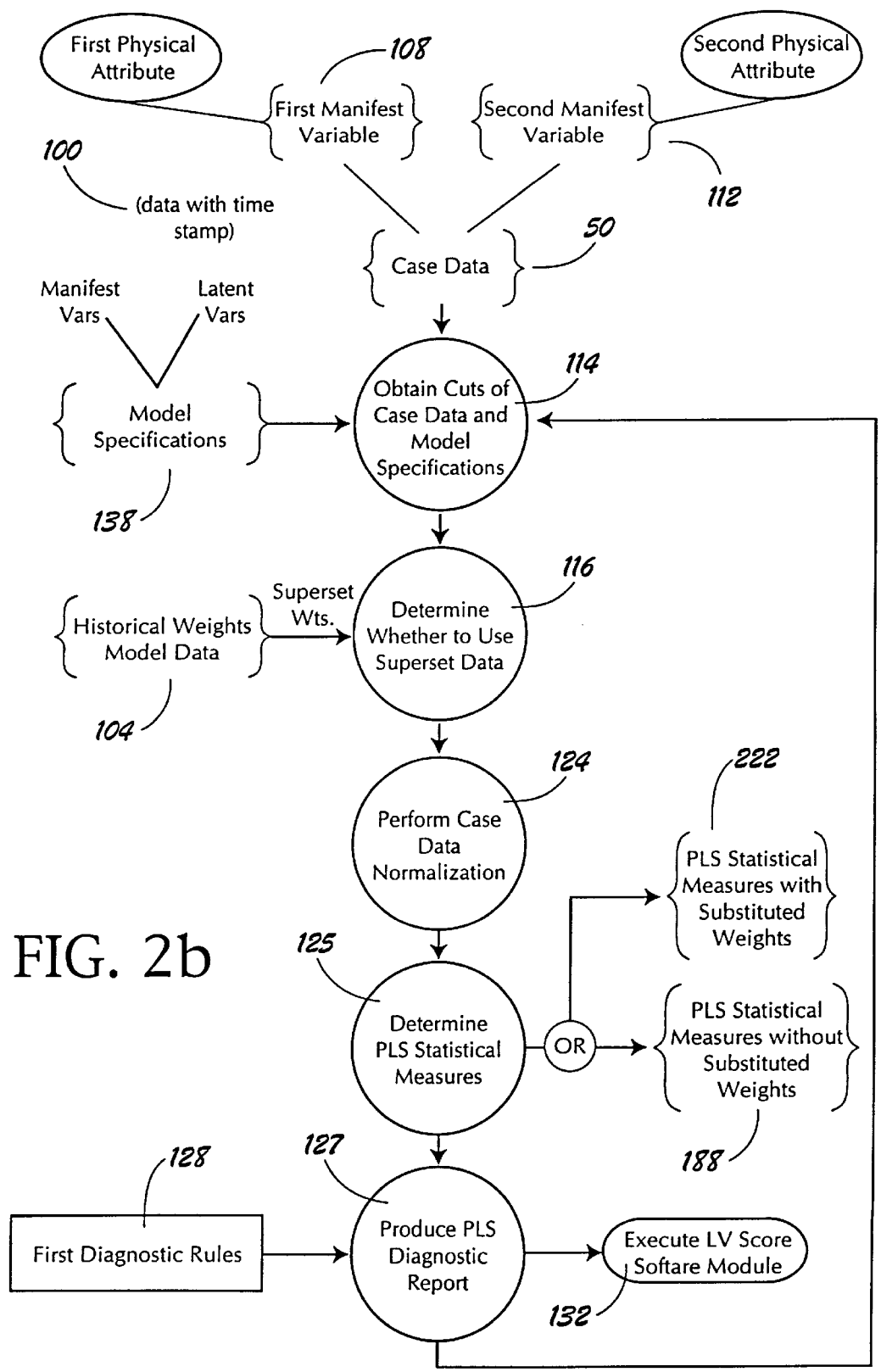
FIG. 2b is a process flowchart depicting the operations performed by the PLS software module

FIG. 2*b* shows the processing steps for the PLS software module and a data breakdown of the case data 50. Case data 50 contains manifest variable data related to one or more cases (i.e., surveys). Case data 50 has a time stamp 100 in order to examine, among other things, trends involving the customer profile case data 50 over a period of time. Customer profile case data 50 as mentioned above contains manifest variable data, such as first manifest variable 108 and second manifest variable 112.

The PLS software module executes data cutting function 114 in order to retrieve particular data records from case data 50 and from model specification data 138 based upon a predetermined criteria. For example, the predetermined criteria may include retrieving the case data associated with all males that had purchased a particular automobile. Based upon that criteria, the case data and the models associated with the case data are retrieved.

The PLS software module performs the PLS weight substitution determination function 116 in order to determine whether a particular case within the customer profile case data 50 needs to use weights from historical weights model data 104. Typically, weight substitution is effected when a case contains fewer data points than a predetermined threshold. The records of the historical weights model data 104 that is similar to the present case data are used to provide PLS weights.

For example, case data that involves a questionnaire that yielded responses from only twenty customers for a particular dealership proves to have too few data points to supply its own PLS weights. Accordingly, historical weights model data 104 utilizes responses previously gathered from that dealership or similar types of dealerships in order to form the PLS weights for that particular case.

The PLS software module 58 also performs a case data normalization function 124. Case data normalization 124 places the manifest variable data on a common scale, for example, on a scale from "0" to "100". This function is provided since responses to different questions may have been scored differently. For example, one question may ask for a response on the scale from 1–5 and another question may ask for a response on the scale from 1–20. Normalization ensures that the responses as contained within the manifest variable data are processed on equal footing with each other.

A PLS statistical calculation function 125 determines PLS statistics based upon the normalized case data and weights. If function 125 used substituted weights in its calculations, then data output 222 is generated. If function 125 did not use substituted weights in its calculations, then data output 188 is generated. The PLS statistical calculation function is described in the following reference: H. Wold (1982) Soft Modeling: The Basic Design and Some Extensions; K. G. J öreskogand H. Wold (Eds.) *Systems Under Indirect Observation: Causality. Structure and Prediction*,Vol. 2, Amsterdam: North Holland, pp.1–54.

After the statistical measures are generated, the user can view the diagnostic messages that were obtained via the PLS diagnostic function 127. PLS diagnostic function 127 uses first diagnostic rules 128 to determine if any errors or warnings had occurred. Moreover, the user can view the data results of the PLS software module to determine if the data results are within predetermined tolerances. Examples of diagnostic and error reports generated by the PLS software module are depicted in FIGS. 11*a*–12*b* and discussed below.

A user may wish to rerun the PLS software module 58 with different model specifications in order to assess whether better results from the PLS software module 58 can be obtained, or the user may proceed to execute the LV score software module at function block 132. If the user wishes to continue execution, the LV score software module utilizes the data generated from the PLS software module in order to produce latent variable scores. It should be noted, however, that the present invention is not limited to a user viewing the results after execution of each software module. The present invention includes full automation of the impact analysis process by allowing complete execution of the PLS software module 58, the LV score software module 70, and the impact software module 82 before returning control back to the user.

Figure 3:
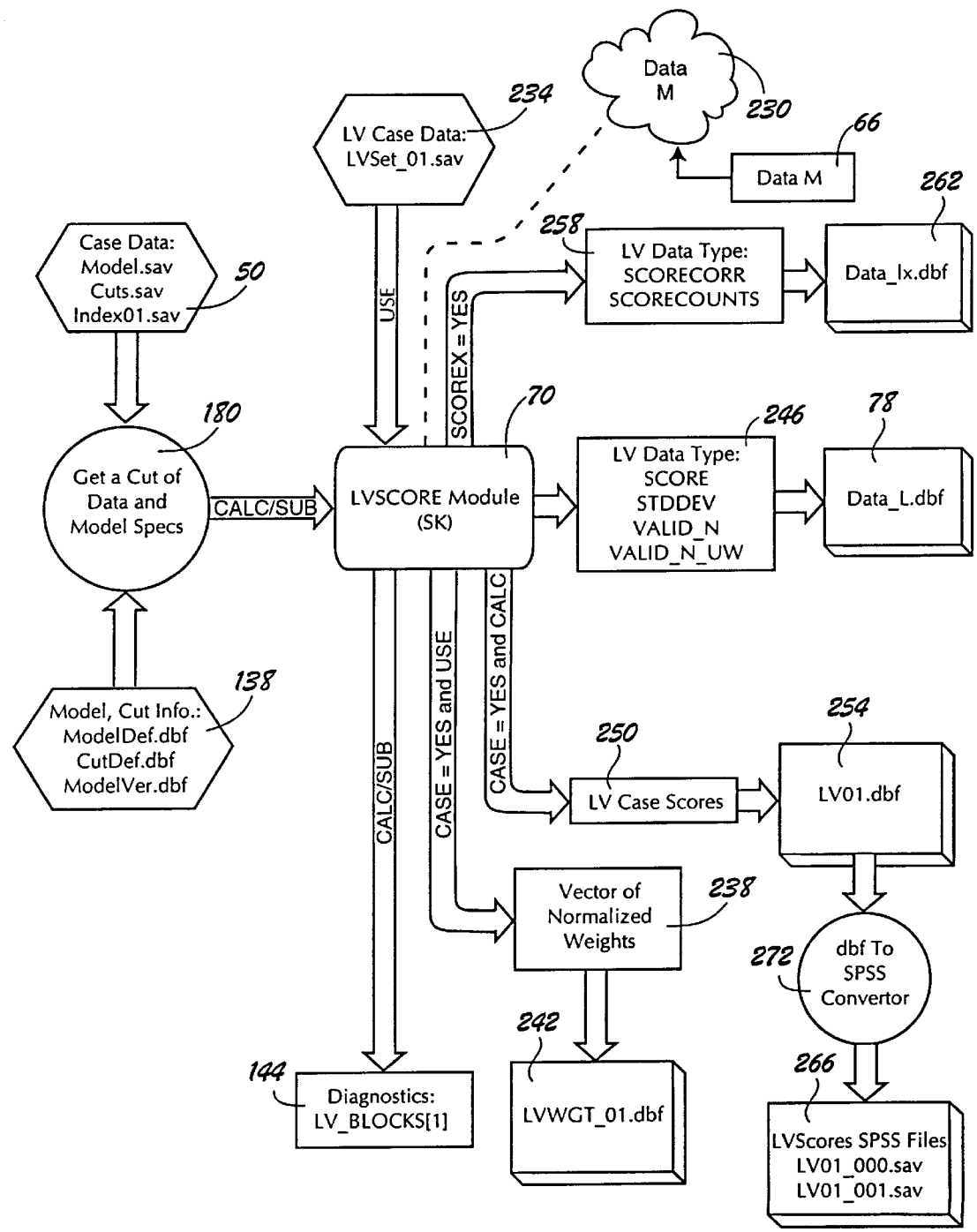
FIG. 3 is a software block diagram illustrating the data flow and methods for the LV score software module.

FIG. 3 depicts the software implementation of the preferred embodiment for the LV score software module 70. The LV score software module 70 uses the weights as determined by the PLS software module 58 in order to produce such data as LV scores. The LV score calculations are generally described in the following reference: H. Wold (1975) Soft Modeling by Latent Variables: the Non-Linear Iterative Partial Least Squares Approach; *Perspectives in Probability and Statistics: Papers in Honor of M.S. Bartlett*. J. Gani (Ed.) Academic Press, London.

The LV score software module 70 obtains the weights from the data_M table 66. Since typically the weights as determined by the PLS software module 58 are still resident in memory 230 of the computer, the weights are obtained from computer memory 230. Moreover, LV score software module 70 utilizes the data cutter 180 to obtain the appropriate data from case data 50 and models specifications tables 138. LV case data 234 is used to derive the mean measure of the appropriate latent variables, and to derive the appropriate associated impact.

The LV score software module 70 invokes the vector of normalized weight software module 238 when the case is equal to "yes" and the method "use" is present. The vector of normalized weights software module 238 is used to compute the case weighted latent variable means such that the sum of those weights equals the number of observations in that segment. The normalized weights are stored in the LVWGT_01 database 242. After the weights are normalized, the latent variable scores are generated by block 246 and are stored in the data_L table 78.

In addition, block 256 generates the following: standard deviation, valid N, a valid N unweighted. Standard deviation as determined by block 246 indicates the standard statistical term for the dispersion of the latent variable. The data type valid N refers to the number of usable cases in the latent variable scores. The data type valid N unweighted refers to the number of usable cases in latent variables prior to weighting.

Additional process blocks are executed if certain predetermined criteria are present. The LV case scores software module 250 is executed when the criterion "case" is set to "yes" and the calc method has been invoked. The LV case scores software module 250 generates case-level data containing the LV scores for each respondent within each segment which is stored in the LVO1 table 254.

Block 258 is executed when "score X" is "yes". The conditional term "score X" refers to a user option that computes and stores intermediate results for subsequent impact pooling if desired. Block 258 generates score correlation and score counts data which are stored in data_LX table 262. Score correlation data refers to a number of correlations in a correlation matrix showing the relationships between LV's. Score count refers to a number of pairwise valid Ns in a matrix showing the number of observations used in each intercorrelation generated by the module.

The LV case scores that were generated by block 250 and stored in the LV01 database 254 are in the preferred embodiment converted to SPSS files 266 by converter 272. This conversion allows analysts to perform additional statistical analysis within the powerful SPSS statistical software package which is provided by the SPSS company.

Additionally, LV score software module 70 can produce LV diagnostics in block 144 which include the statistics shown in the diagnostic report depicted in FIG. 13a.

Figure 4:
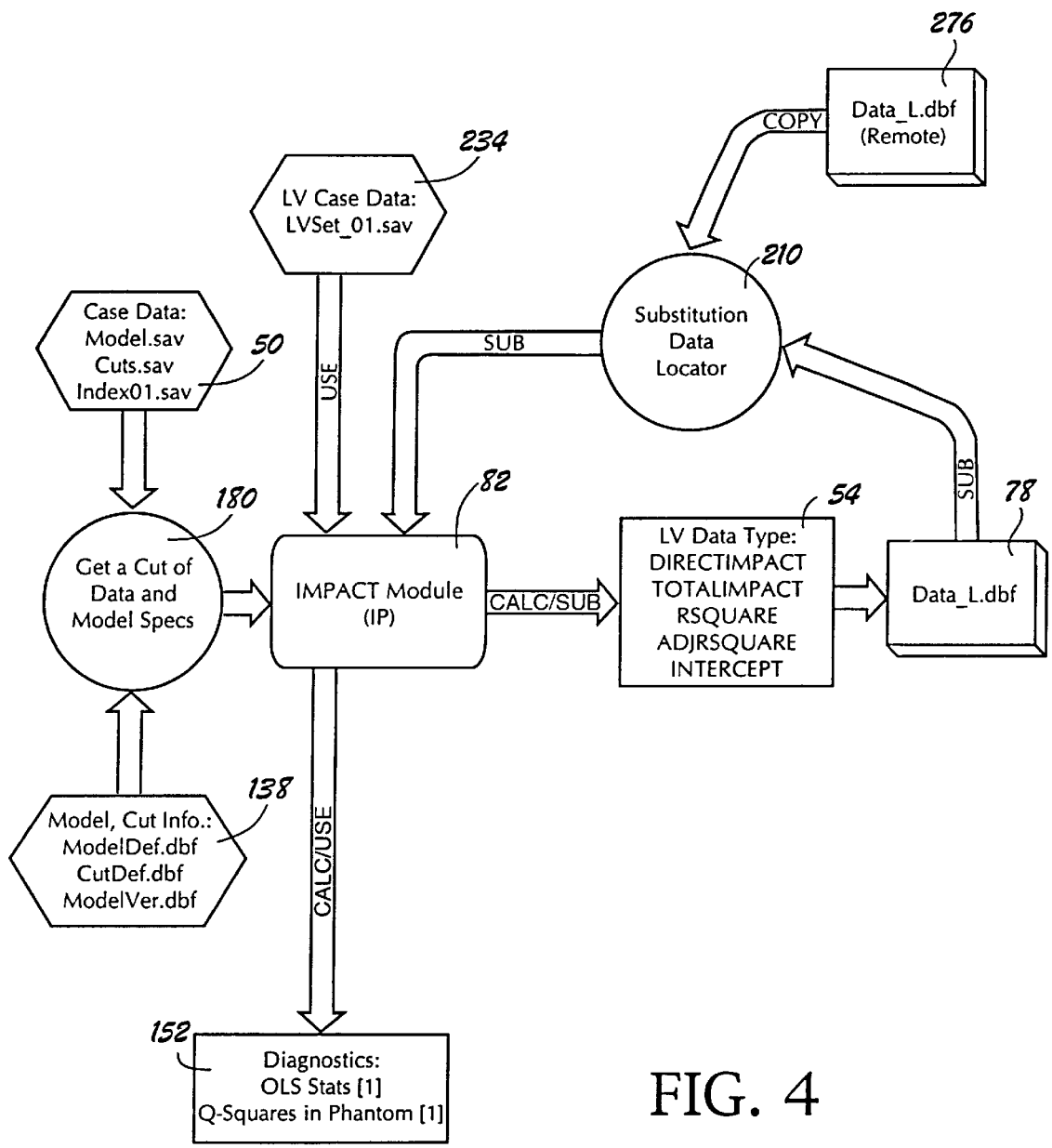
FIG. 4 is a software block diagram illustrating the data flow and methods for the impact software module.

FIG. 4 depicts the preferred embodiment for the impact software module 82. The impact software module 82 uses case date 50, model specification data 138, and LV score data as contained in LV case data 234 in order to generate impact data 54. The generated impact data 54 is stored in data_L table 78.

Impact software module 82 uses data cutter 180 to acquire the appropriate case data 50 and model specification data 138 for the present run. Moreover, substitution data locator software module 210 is used in order to provide the impact software module 82 with data from previous runs. Data substitution with respect to the impact software module 82 is typically performed when the number of valid observations is too low to ensure consistent reliability. The data are retrieved by the substitution datalocator software module 210 from a remote data_L database 276. The data retrieved from the remote data_L database 276 includes direct impacts and total impacts. The impact calculations are typically regression coefficients multiplied by five.

Additionally, impact software module 82 utilizes impact diagnostic rules 152 in order to determine how well the models had performed. The impact diagnostic rules 152 include the statistics shown in the diagnostic report depicted in FIG. 14a.

Figure 5A:
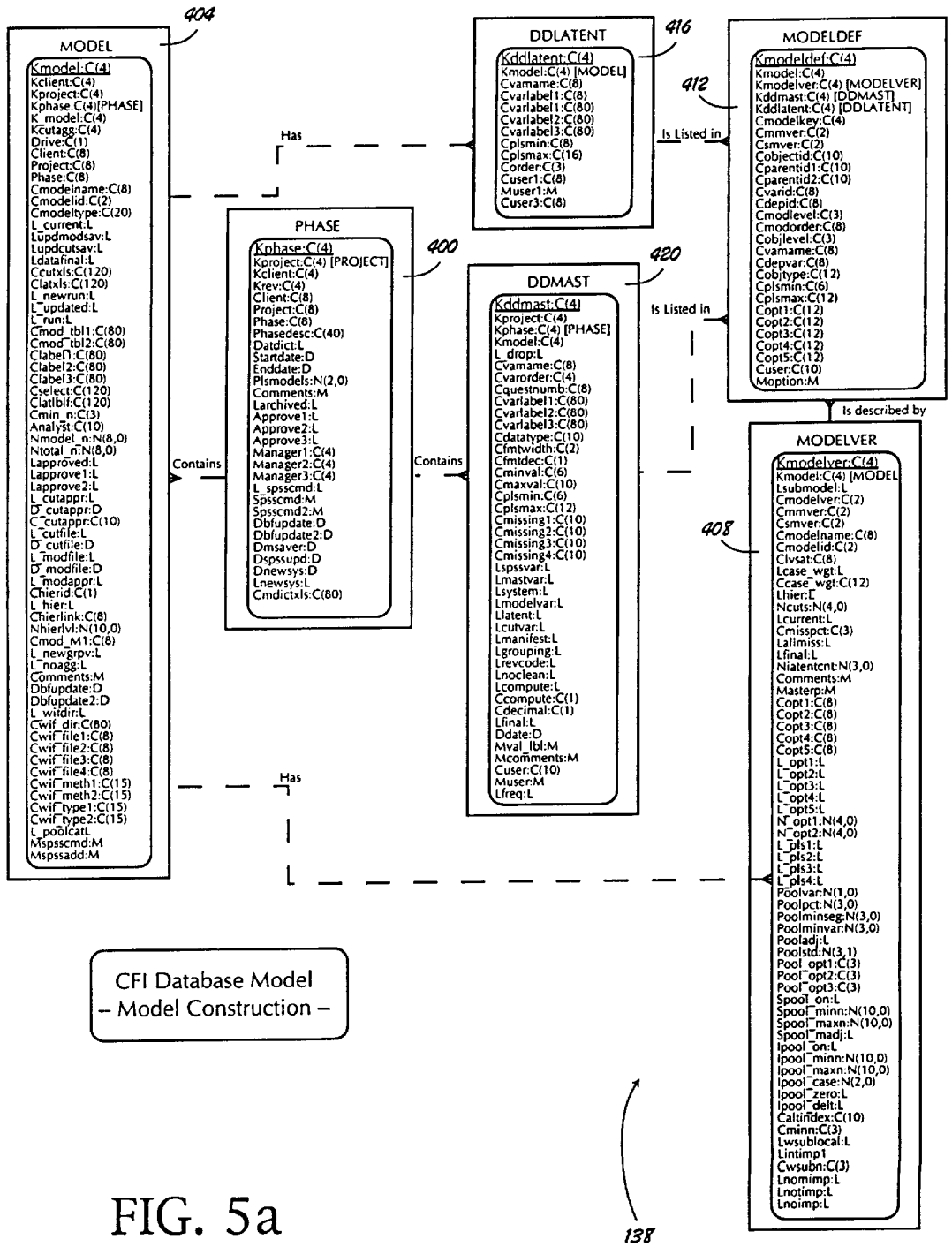
FIGS. 5a–5b are entity relationship diagrams depicting the schema of the database utilized within the present invention.
Figure 5B:
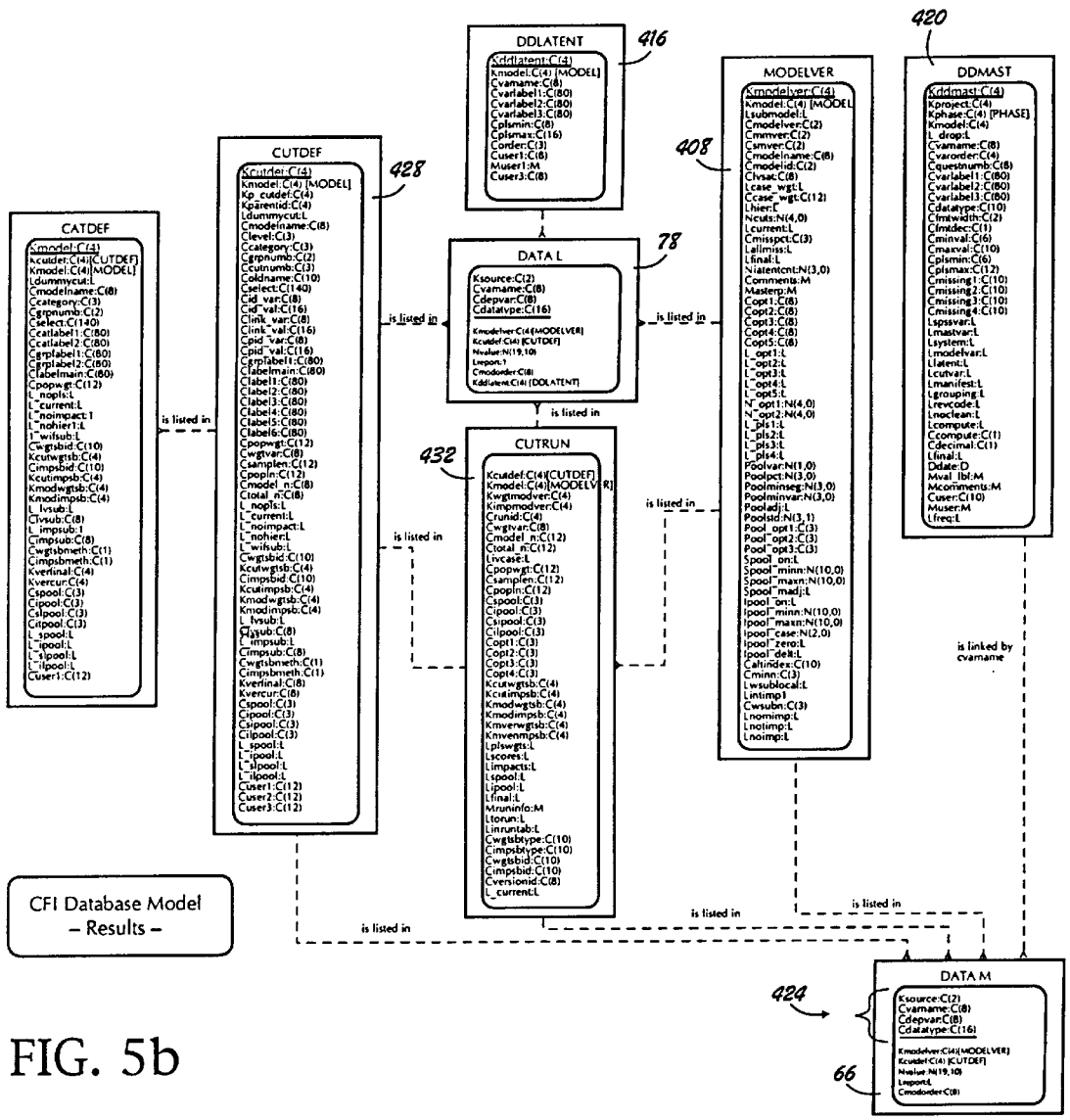

FIGS. 5a–5b depict the database schema utilized in the preferred embodiment of the present invention. FIG. 5a depicts those tables which are specially used to construct the model specification data 138. The phase table 400 provides project management information such as the project title (e.g., of a customer satisfaction survey project), the name, start and end dates of the project, and other such project management-related information. A project phase typically has multiple models and therefore phase table 400 has a one-to-many relationship with the model table 404. Model table 404 contains such model-related data as the model's name, a unique model identifier, and dates and times when the model was run and for what particular data cuts the model was used.

A model can have multiple versions and therefore model table 404 has a one-to-many relationship with the model version table 408. The model version table 408 contains such version-related model data as what options were involved with a particular model version. Each version of a model is formally defined in the model definition table 412.

Model definition table 412 depicts what manifest variables and latent variables are included for a particular model. The latent variables are defined in greater detail in the latent variable table 416. Latent variable table 416 includes the variable name as well as minimum and maximum values of the latent variable. Similarly, the manifest variables are defined in the manifest variable table 420.

FIG. 5b depicts the tables which are specially used to store the results generated by the present invention. Data results that are related to manifest variables are stored in the data_M table 66. For example, the PLS software module 58 (not shown) stores its data results in this table. The data_M table 66 provides the "links" to the other tables that are involved with manifest variable data. The manifest variable table 420 is linked to the data_M table 66 by the field "Cvarname".

The fields which ensure the uniqueness for a particular record in the data_M table 66 are boldfaced and generally depicted by reference numeral 424. The primary keys for the other tables on FIGS. 5a and 5b are similarly depicted.

The results related to the latent variables are stored in the data_L table 78. Within the data_L table 78 are listed the primary keys as well as other fields, such as "N value" which holds the value for a particular latent variable. The links to the other tables via the fields in data_L table 78 and data_M table 66 are provided next to the fields enclosed in brackets. For example, the data_L table 78 is linked to the cutdef table 428 by the field "Kcutdef".

Cutdef table 428 includes statistical information on various cuts of data that are performed upon the case data and model data. The cutrun table 432 stores dynamic run option data that reflect decision the user has made about the model version.

FIGS. 6–14b illustrate various data results of the present invention. FIG. 6 depicts a computer screen 450 wherein various run parameters are specified. Within computer screen 450, the client name, project, and other project management-related data are specified within the region generally depicted by reference numeral 454. Run parameters are specified within the region depicted by reference numeral 458. Such parameters include the minimum number of case data before weight substitution and copy impacts are utilized.

FIG. 7 depicts exemplary manifest variables and latent variables. Row 490 is the unique cut identifier that is being used in this example. The unique cut identifier value contains three individual pieces of information. The "001" value in the cut identifier identifies the category. The "01" value in the cut identifier indicates the designated group. The value "002" in the cut identifier indicates the designated cut. The unique cut identifier can contain temporal information, and the identifier can be used as part of a hierarchial three structure to isolate subgroups as well as larger embedding entities.

Column 494 identifies the latent variables and the manifest variables that are involved for this particular cut identifier. Column 498 identifies descriptive labels associated with each of the variables in column 494. The latent variables are identified on FIG. 7 by an identifier of "LV". The manifest variables are designated by the identifier "MV". For example, the latent variable "BROCH1" has associated the following manifested variable: BROCHUR1, BROCHUR2, BROCHUR3, BROCHUR4, AND BROCHUR5. The latent variable "BROCH1" is related to the general category of information brochures, while the manifest variable "BROCHUR1" relates to the measurable excitement generated by the brochures. The measured manifest variable "BROCHUR1" is used by the present invention in order to assess impact upon the latent variable "BROCH1".

FIGS. 8a and 8b depict the scores and other statistical measures associated with the manifest and latent variables. The statistical measures as determined by the PLS software module are displayed, for example, in region 500 for the brochure-related manifest variables. The LV score software module generated data for the latent variable "BROCH1" is depicted by reference numeral 504.

The manifest and latent variable data results depicted in regions 500 and 504 show the output created by block 58 and block 70 for our example, using brochure-related data.

FIGS. 9a–9b depict impact data results associated with such latent variables "Broch1". The direct impact data results 508a and total impact data results 512a are provided on FIG. 9a. FIG. 9b includes a second set of impact results, namely direct impact data results 508b and total impact data results 512b which involve case data that has a smaller number of case samples.

Referring to FIG. 9a, direct impact data results 508a include R-square data results 516, adjusted R-square data results 520, and intercept data results 524. Each of these data results are placed under a satisfaction column as well as a recommendation column. The satisfaction column shows the computed impacts linking latent variables to an optimally weighted score for satisfaction. The recommendation column shows the computed impacts linking latent variables to standardized, unweighted scores for reported intention to recommend the product (i.e., a single data point in the case level data).

The difference between direct impact 508a and direct impact 508b resides in the fact that the direct impact 508b examined fewer case data samples than in the direct impact 508a run.

FIG. 10 provides a run status report wherein for a particular project the status for each particular cut is provided. For example, FIG. 10 indicates that the PLS software module, the LV score software module and the Impact software module were performed for a total of 480 case data samples 469 which represented valid usable data points for cut "000_00_001".

FIGS. 11a–11b depict a diagnostics report that is generated by the PLS software module. The following statistical measures are provided in the PLS diagnostics report: Valid cases, minimum, maximum, Raw mean, Raw standard deviation, Percentage mean, Percentage standard deviation, standardized weight, standard loading, unstandardized weighting, unstandardized loading and communality (a standardized statistical term that measures the amount of shared variance). These diagnostic statistical measures are provided for each of the manifest variables for a particular run.

FIG. 11b depicts additional diagnostic statistical measures generated by the PLS software module: reliability data 540, latent variable block eigen values 544, and overall fit measures 548. The reliability data results 540 signify that reliability equals 1 when there is only one datapoint.

The LV block eigen values signify a standard statistical measure to show the magnitude of manifest loadings on its associated latent variables. The overall fit measures 548 include the following statistical measures: degrees of freedom, average commonalities, RMS data, RMS multivariate covariance, RMS multivariate covariance explained, RMS latent variable correlation, RMS psi (the convariance matrix and the prediction residuals), average R-squared, RMS latent variable correlation explained, and RMS fit. For a general discussion of each of these statistical measures. See Jöreskog K. G. and Sörbom, D. (1981) LISREL V: Users Guide, Chicago: National Educational Resources.

FIGS. 12a and 12b depict errors that the PLS software module had detected. Depending upon the severity of the error detected and the diagnostic level value as set by the user, the PLS module may terminate execution.

FIG. 12a depicts an error wherein "weights had a mixed sign". The mixed sign error detection exemplifies the advantages that the present invention offers over previous methods. Although it is not mathematically incorrect to have a model with negative mixed signs, a model with negative mixed signs typically does not reflect the "real world." For example, a model having negative mixed signs would indicate that customer satisfaction decreases as a particular manifest variable increases (such as percentage of on-time deliveries). Such an indication is unrealistic, and the present invention specifically detects this situation and informs the user of it.

FIG. 12b depicts the error wherein loadings were marked "bad" in the model and consequently the weight matrix for the model could not be created. Such a situation would arise when the pis weights are missing for any number and reasons such as, lack of variance in a variable.

FIGS. 13a–13c depict diagnostic results as generated by the LV score software module. The statistical measures that are examined within the diagnostics generated by LV score software module include: the number of the manifest in the latent variable ("MV#"), number of case samples, minimum, maximum, mean, and standard deviations. Moreover, the diagnostics generated by the LV score software module also include: collinearity statistical measures: eigen value, the condition index (a standard statistical term) ("cond_num"), constant, and percentage of decomposition variance shared. FIGS. 13b and 13c are continuations of the report.

FIG. 13c also includes additional statistical measures generated by the LV score software module: RMS residual, "ULS goodness of fit, ULS adjusted goodness of fit, ULS parsimony goodness of fit.

FIGS. 14a–14b depict exemplary diagnostic data results generated by the impact software module. In this example, FIGS. 14a and 14b depict three types of diagnostics generated by the impact software module: latent variable correlation statistical measures, path coefficients, and satisfaction/recommendation statistical measures. The latent variable correlation statistical measures signify intercorrelations between latent variables. The path coefficient statistical measures signify the magnitude of standardized path coefficients from latent variables to the dependent variable of interest which in this case is satisfaction. The satisfaction/recommendation statistical measures signify intercorrelation between the two dependent variables, which in this example are satisfaction and reported intention to recommend the product or service being studied.

While the invention has been described in its presently preferred form, it will be understood that the invention is capable of modification without departing from the spirit of the invention as set forth in the appended claims.

It is claimed:

1. A computer-implemented apparatus for determining the impacts of predetermined customer characteristics associated with measured physical attributes, comprising:

a manifest variable database for storing manifest variable data that is indicative of the measured physical attributes;

a partial least squares determinator connected to said manifest variable database for determining statistical weights based upon said stored manifest variable data;

a weights database connected to said partial least squares determinator for storing said determined weights;

a latent variable determinator connected to said weighing database for determining scores for latent variables based upon said stored manifest variables and upon said stored weights, said latent variables being indicative of the predetermined customer characteristics;

a latent variable database connected to said latent variable score determinator for storing said determined latent variable scores; and an impact determinator connected to said latent variable database for determining impact relationships among said latent variables based upon said stored latent variable scores.

2. The apparatus of claim 1 wherein said manifest variable data includes performance metric data, said impact determinator determining impact relationships of said latent variables upon said performance metric data based upon said latent variable scores and upon said performance metric data.

3. The apparatus of claim 1 further comprising:

a historical weights model database for storing superset weights related to said manifest variables;

a weight substitution determinator connected to said partial least squares determinator for selecting said superset weights based upon a predetermined criterion.

4. The apparatus of claim 3 wherein said manifest variable data are associated with a plurality of cases associated with said measured physical attributes, wherein said predetermined criteria include the numbers of cases associated with said manifest variable data.

5. The apparatus of claim 4 further comprising:

a weight average for determining the average of said selected weights, said latent variable determinator determining said latent variable scores based upon said manifest variable data and upon the average of said selected weights.

6. The apparatus of claim 5 further comprising:

a manifest variable normalizer for normalizing said manifest variable data to a predetermined scale, said latent variable determinator determining said latent variable scores based upon said normalized manifest variable data and upon the average of said normalized weights.

7. The apparatus of claim 1 further comprising:

first diagnostic rules connected to said partial least squares determinator for determining performance of said partial least squares determinator based upon a predetermined criteria.

8. The apparatus of claim 7 wherein said partial least squares determinator selects weights based upon said first diagnostic rules.

9. The apparatus of claim 1 further comprising:

second diagnostic rules connected to said latent variable determinator for determining performance of said latent variable determinator based upon predetermined criteria.

10. The apparatus of claim 9 wherein said latent variable determinator interprets latent variable scores based upon said second diagnostic rules.

11. The apparatus of claim 1 further comprising:

third diagnostic rules connected to said impact determinator to determine performance of said impact analyzer based upon predetermined criteria.

12. The apparatus of claim 11 wherein said impact determinator interprets said impact relationships based upon said third diagnostic rules.

13. The apparatus of claim 1 wherein said impact determinator uses regression analysis to determine said impact relationships.

14. The apparatus of claim 13 wherein said regression analysis includes analysis being selected from the group consisting of phantom regression analysis, constrained regression analysis, multi-variate regression analysis, and combinations thereof.

15. The apparatus of claim 1 wherein said impact determinator produces output being selected from the group consisting of direct impact output, total impact output, R-square output, adjusted R-square output, intercept analysis output, and combinations thereof.

16. The apparatus of claim 1 wherein said manifest variable data is associated with time data, said impact determinator determining the impact of the measured physical attributes in a temporal domain using said manifest variable data and said associated time data.

17. The apparatus of claim 1 further comprising:

a models database for storing a plurality of models for establishing interrelationships among said manifest variable data, said latent variable determinator determining scores for said latent variables using said model specifications.

18. The apparatus of claim 17 further comprising:

diagnostic rules for comparing one of said plurality of models with another model in said plurality of models to interpret the degree of fit between said models.

* * * * *